(12) United States Patent
Spiegel et al.

(10) Patent No.: US 9,597,938 B2
(45) Date of Patent: Mar. 21, 2017

(54) HIGH STRENGTH, LIGHT WEIGHT COMPOSITE LEAF SPRING AND METHOD OF MAKING

(71) Applicant: PolyOne Corporation, Avon Lake, OH (US)

(72) Inventors: Jonathan Spiegel, Aurora, CO (US); Benjamin D. Pilpel, Centennial, CO (US); Edward D. Pilpel, Avon, CT (US); Michael Gordon, Lone Tree, CO (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 14/215,799

(22) Filed: Mar. 17, 2014

(65) Prior Publication Data
US 2014/0284855 A1   Sep. 25, 2014

Related U.S. Application Data

(60) Provisional application No. 61/788,800, filed on Mar. 15, 2013.

(51) Int. Cl.
*F16F 1/18* (2006.01)
*B60G 11/02* (2006.01)
*F16F 1/368* (2006.01)

(52) U.S. Cl.
CPC .............. *B60G 11/02* (2013.01); *F16F 1/368* (2013.01); *B60G 2202/11* (2013.01); *B60G 2206/428* (2013.01); *B60G 2206/7101* (2013.01)

(58) Field of Classification Search
CPC .... F16F 1/18; F16F 1/185; F16F 1/368; F16F 2224/0241; B60G 11/02; B60G 2202/11; B60G 2206/428; B60G 2206/7101
USPC ............. 267/36.1, 41, 42, 43, 44, 45, 46, 47
See application file for complete search history.

(56) References Cited

U.S. PATENT DOCUMENTS

| | | |
|---|---|---|
| 1,902,036 A | 3/1933 | Lindhe |
| 2,236,522 A | 4/1941 | Cook |
| 3,204,944 A | 9/1965 | Brownyer |
| 3,219,333 A | 11/1965 | Derschmidt et al. |
| 3,437,550 A | 4/1969 | Paul, Jr. |
| 3,900,357 A | 8/1975 | Huchette et al. |
| 4,411,159 A | 10/1983 | Spear et al. |
| 4,457,500 A | 7/1984 | Drachenberg et al. |
| 4,468,014 A | 8/1984 | Strong |
| 4,509,774 A | 4/1985 | Booher |
| 4,613,152 A | 9/1986 | Booher |

(Continued)

FOREIGN PATENT DOCUMENTS

| | | |
|---|---|---|
| CN | 1820932 A | 8/2006 |
| DE | 102011104071 A1 | 12/2012 |

(Continued)

OTHER PUBLICATIONS

SPI—Plastics Industry Trade Association—Definition of Resins, 2012.*

(Continued)

*Primary Examiner* — Thomas J Williams
(74) *Attorney, Agent, or Firm* — MKG LLC

(57) ABSTRACT

A composite leaf spring comprising a thermoplastic matrix material reinforced with fibers embedded and aligned in the matrix of the composite leaf spring.

19 Claims, 25 Drawing Sheets

(56) References Cited

U.S. PATENT DOCUMENTS

| | | | |
|---|---|---|---|
| 4,747,898 A * | 5/1988 | Woltron | 267/47 |
| 4,753,456 A | 6/1988 | Booher | |
| 4,767,134 A | 8/1988 | Booher | |
| 4,772,044 A | 9/1988 | Booher | |
| 4,861,067 A | 8/1989 | Booher | |
| 4,889,361 A | 12/1989 | Booher | |
| 4,893,832 A | 1/1990 | Booher | |
| 4,988,080 A | 1/1991 | Shah | |
| 5,251,886 A | 10/1993 | Bursel | |
| 5,667,206 A | 9/1997 | Chang | |
| 5,816,356 A | 10/1998 | Jansson et al. | |
| 6,012,709 A | 1/2000 | Meatto et al. | |
| 6,189,904 B1 | 2/2001 | Gentry et al. | |
| 6,338,300 B1 | 1/2002 | Landrot | |
| 6,461,455 B1 | 10/2002 | Meatto et al. | |
| 6,660,114 B2 | 12/2003 | Meatto et al. | |
| 6,679,487 B2 | 1/2004 | Meatto et al. | |
| 2002/0153648 A1 | 10/2002 | Lawson | |
| 2002/0153689 A1 | 10/2002 | Schroeder et al. | |
| 2002/0175487 A1 | 11/2002 | Lawson | |
| 2003/0030241 A1 | 2/2003 | Lawson | |
| 2003/0178756 A1 | 9/2003 | Meatto et al. | |
| 2008/0284069 A1 | 11/2008 | Aulich et al. | |
| 2012/0211931 A1 | 8/2012 | Fane De Salis | |
| 2012/0286492 A1 | 11/2012 | Sjoesten et al. | |
| 2012/0292978 A1 | 11/2012 | Buschjohann et al. | |
| 2014/0284856 A1 * | 9/2014 | Stay | 267/47 |
| 2014/0353937 A1 | 12/2014 | Girelli Consolaro et al. | |
| 2015/0000553 A1 | 1/2015 | Kimura et al. | |
| 2015/0102575 A1 | 4/2015 | Lake et al. | |
| 2015/0217615 A1 | 8/2015 | Drabon et al. | |
| 2016/0046162 A1 | 2/2016 | Seethaler et al. | |

FOREIGN PATENT DOCUMENTS

| | | | | |
|---|---|---|---|---|
| DE | 2012207487 A1 | 11/2013 | | |
| EP | 0134617 | 3/1985 | | |
| EP | 0213109 A2 * | 3/1987 | | B29C 70/08 |
| EP | 0851142 A1 | 7/1998 | | |
| GB | 1448078 | 9/1976 | | |
| JP | 357163742 | 10/1982 | | |
| JP | 1988-120925 A | 5/1988 | | |
| JP | H01-98716 A | 4/1989 | | |
| JP | 1991-172634 A | 7/1991 | | |
| JP | 1991-234937 A | 10/1991 | | |
| JP | 2005521002 A | 7/2005 | | |
| JP | 2012202454 A | 10/2012 | | |
| WO | 8503987 A1 | 9/1985 | | |

OTHER PUBLICATIONS

EPO machine translation, EP 0213109 A2, Mar. 1987.*
Udovenko, S., Experimental Determination of the Creep Characteristics of Fiber Glass-Reinforced Plastics, NASA TT F-12, 742, National Aeronautics and Space Administration, Washington, D.C., Mar. 1970.
International Search Report and Written Opinion for PCT/US2014/030223, dated Aug. 12, 2014, pp. 1-9.
International Search Report and Written Opinion for PCT/US2014/030377, dated Aug. 12, 2014, pp. 1-15.
International Preliminary Report on Patentability for PCT/US2014/030223, mailed on Jun. 5, 2015, 8 pages.
Partial Supplementary European Search Report issued in corresponding European Patent Application No. 14762336.7 dated Jul. 11, 2016.
Office Action for Chinese Patent Application No. 2014800232311, dated Jul. 21, 2016, 12 pages including original Office Action and English language machine translation thereof.
Office Action issued in Canadian Patent Application No. 2,905,512, dated Aug. 16, 2016.
International Search Report for PCT Application No. PCT/US2015/45213, mailed on Nov. 24, 2015, 8 pgs.
International Preliminary Report on Patentability and Written Opinion for PCT/US2015/045213, dated Aug. 22, 2016, 4 pages.
International Preliminary Report on Patentability for PCT/US2014/030377, mailed Jun. 3, 2015, 7 pages.
Supplementary European Search Report for PCT Application No. PCT/US2014/030377, mailed on Oct. 19, 2016, 9 pgs.
Summary re Notice of Preliminary Rejection for Korean Patent Application No. 10-2015-7028660, dated Nov. 9, 2016, 2 pgs.
Notice of Preliminary Rejection issued in Korean patent application No. 10-2015-7028660 dated Nov. 8, 2016 (5 pages) and English translation thereof (5 pages); 10 pages total.
Office Action issued in Japanese Patent Application No. 2016-503387, dated Dec. 1, 2016.

* cited by examiner

FIG. 9A
Conventional
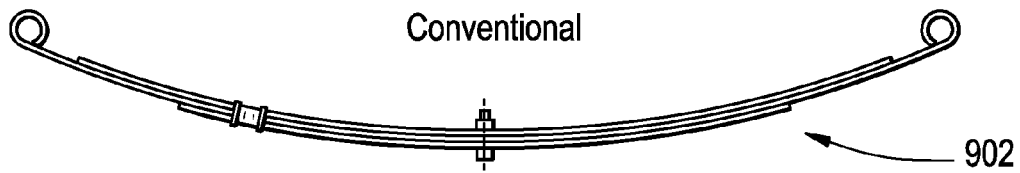
Eye Mounted Spring
Taper Ended Slide Spring
Progressive Spring
Trailer Spring Polystrand IE 7010 Composite
Strain vs Time Tensile Strength (90 Degree)

Youngs Modulus (90 Degree)

Compression Strength (0 Degree)

In-Plane Shear Strength (IOSEPESCU)

In-Plane Shear Modulus (IOSEPESCU)

Interlaminar Shear Strength

Creep Strain vs. Time

Creep Strain vs. Time

Stress Strain Diagram

HIGH STRENGTH, LIGHT WEIGHT COMPOSITE LEAF SPRING AND METHOD OF MAKING

CROSS REFERENCE TO RELATED APPLICATION

This patent application claims priority benefit under 35 U.S.C. §119(e) of commonly owned U.S. Provisional Patent Application Ser. No. 61/788,800, filed on Mar. 15, 2013, entitled "High Strength, Light Weight Composite Leaf Spring and Method of Making", the content of which is incorporated by reference herein in its entirety.

TECHNICAL FIELD

The present disclosure is generally directed to leaf springs and particularly directed to composite leaf springs and methods of making the leaf springs for applications, such as automotive and truck suspension systems.

BACKGROUND

Vehicle manufacturers have long sought to reduce weight of vehicles for the purposes of improving fuel economy, increasing payload capacity, and enhancing the ride and handling characteristics of automobiles, trucks, utility vehicles, and recreational vehicles. A large proportion of vehicles employ steel leaf springs as load carrying and energy storage devices in their suspension systems. While an advantage of steel leaf springs is that they can be used as attaching linkages and/or structural members in addition to their capacity as an energy storage device, they are substantially less efficient than other types of springs in terms of energy storage capacity per unit of mass. Steel leaf springs are heavy by nature, noisy, and subject to corrosion. This weight requires additional consideration with respect to mounting requirements, as well as damping requirements. For instance, shock absorbers are often necessary with the use of steel leaf springs in order to control the mass of the leaf spring under operating conditions.

Accordingly, what is needed is an alternative leaf spring that can provide a higher energy per unit mass and thus a lighter weight assembly construction.

SUMMARY

According to aspects illustrated herein, there is provided a composite leaf spring comprising a thermoplastic matrix material reinforced with fibers embedded and aligned in the matrix of the composite leaf spring.

BRIEF DESCRIPTION OF THE DRAWINGS

FIG. 1 is a schematic illustration of a hybrid composite leaf spring assembly, with a flat second stage, according to embodiments;

FIG. 2 is a cross-sectional view of the primary stage of the hybrid composite leaf spring of FIG. 1;

FIG. 3 is a schematic illustration of an alternate configuration of a composite leaf spring assembly comprising a steel main leaf and a flat composite second stage load leaf, according to embodiments;

FIG. 3A is a schematic illustration of a further configuration of a composite leaf spring comprising a steel main leaf and a composite second stage load leaf of a curved form, according to embodiments;

FIG. 4 is a schematic illustration of a perspective view of a full composite leaf spring including integrated attachment eyes, according to embodiments;

FIG. 5 is a schematic illustration of a partial perspective view of a composite suspension control arm, according to embodiments, functioning as a suspension control arm and spring and depicted in a rising rate mounting configuration, according to embodiments;

FIG. 5A is a schematic illustration of a transversely mounted full composite leaf spring, according to embodiments;

FIG. 6 is a partial perspective view of a rear suspension cantilever in frame assembly using another configuration of a composite leaf spring, according to embodiments, comprising a laminate as the locating member for the rear axle;

FIG. 7 is a perspective view of a rear suspension cantilever in frame assembly using a further configuration of a composite leaf spring, according to embodiments, comprising a laminate as the locating member for the rear axle;

FIG. 8 is a side view of a rear suspension cantilever in frame assembly using a further configuration of a composite spring, according to embodiments, comprising a laminate as the locating member for the rear axle;

FIG. 9 illustrates at FIGS. 9A-9E side views of five types of leaf springs; specifically FIG. 9A illustrates a standard leaf spring; FIG. 9B illustrates an eye mounted spring, according to embodiments; FIG. 9C illustrates a taper ended slide spring, according to embodiments; FIG. 9D illustrates a progressive spring, according to embodiments; and FIG. 9E illustrates a trailer spring, according to embodiments;

FIG. 10 is a schematic illustration of a composite leaf spring, according to embodiments, comprising stacked, successive layers forming a tapered profile;

FIG. 11 is a schematic illustration of a composite leaf spring, according to embodiments, showing a tapered spring profile obtained after successive layers, such as the layers of FIG. 10, are heated and consolidated;

FIG. 12 is a schematic illustration of a composite leaf spring, according to embodiments, comprising wrapped, successive layers;

FIG. 13 is a schematic illustration of a composite leaf spring, according to embodiments, comprising wrapped, successive layers, attachment eyes and an insert;

FIG. 14 is a schematic illustration of a composite leaf spring, according to embodiments, comprising successive layers, attachment eyes and an insert, and depicted in a curved profile obtained after the layers are heated and consolidated;

FIG. 15 is a schematic illustration of a composite leaf spring, according to embodiments, showing a tapered spring profile obtained after wrapped layers are heated and consolidated;

FIG. 16 is a schematic illustration of a perspective view of a multi-leaf spring, according to embodiments, comprising a flat, fiber reinforced composite second stage. It is noted that three plates are depicted therein as part of the primary leaf construction, however, more or less plates could be employed as needed;

FIG. 17 is a schematic illustration of a perspective view of a multi-leaf spring, according to embodiments, comprising a curved, fiber reinforced composite second stage. It is noted that three plates are depicted therein as part of the primary leaf construction, however, more or less plates could be employed as needed;

FIG. 18 is a schematic illustration of a perspective view of a composite leaf spring, according to embodiments, comprising a hybrid leaf, a metal main leaf, and fiber reinforced thermoplastic composite cladding;

Figure 26:
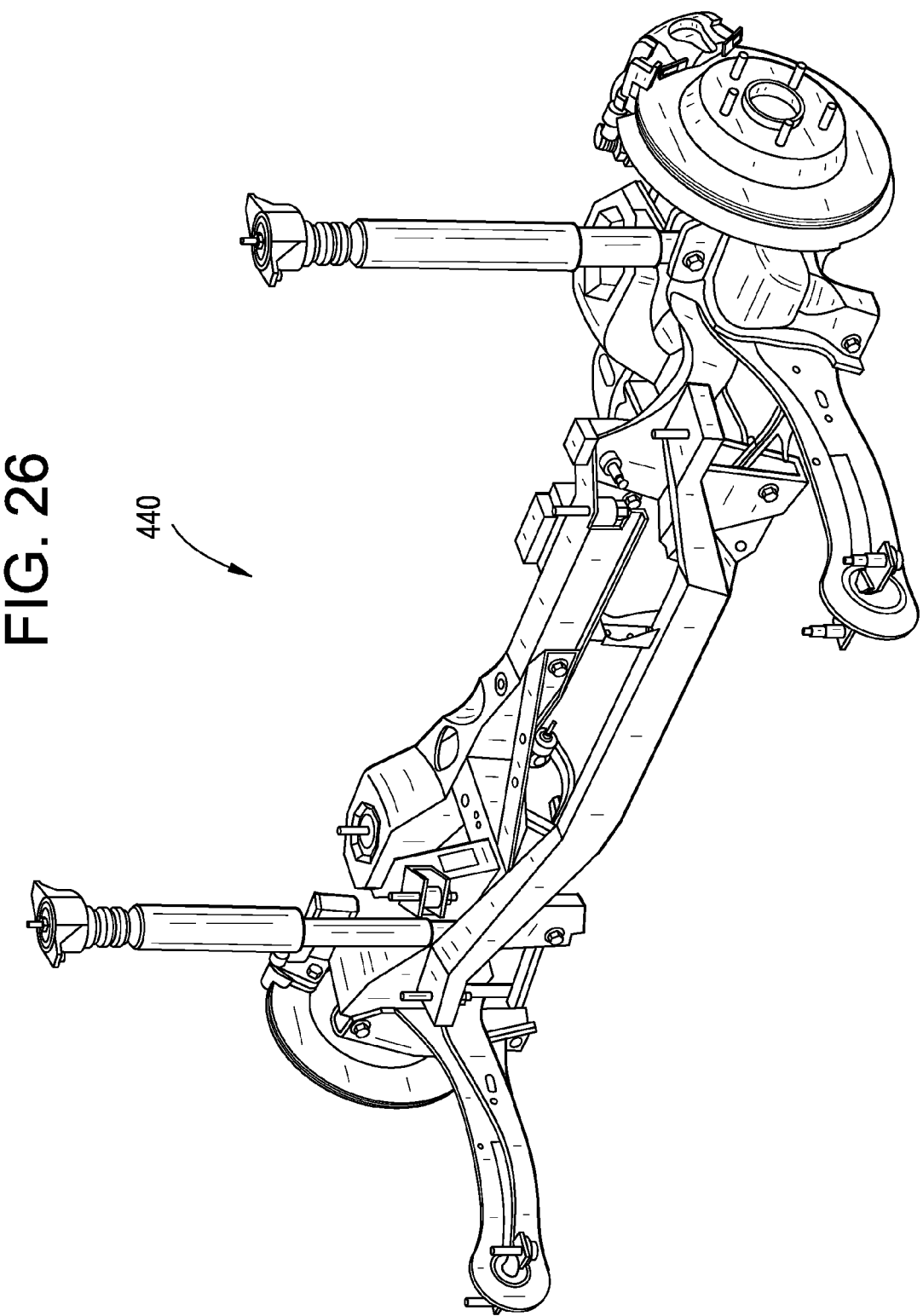
Figure 27:
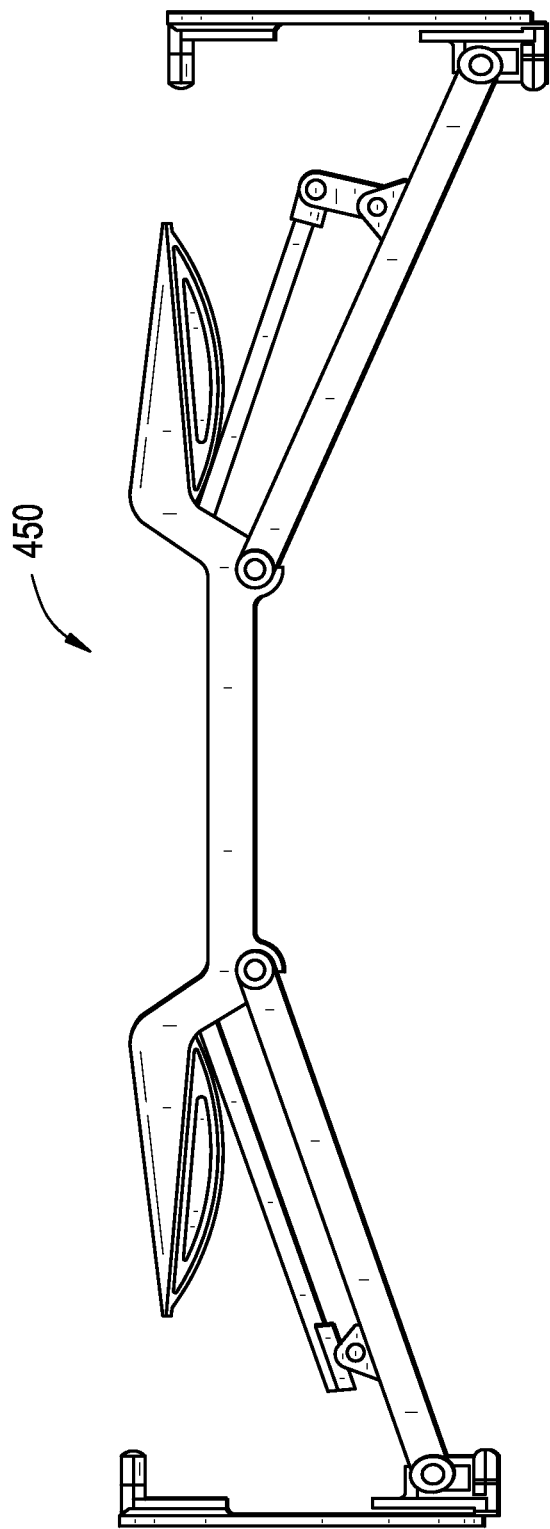
Figure 28:
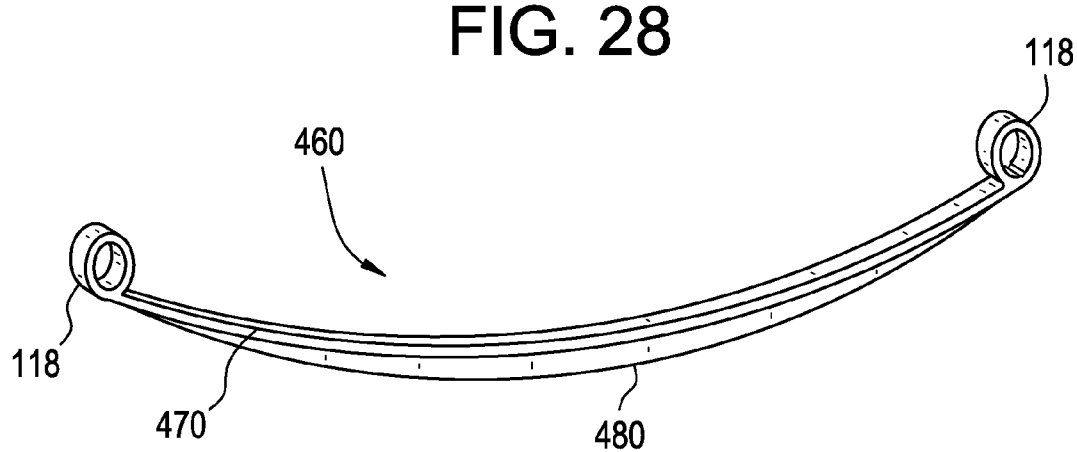
Figure 29:
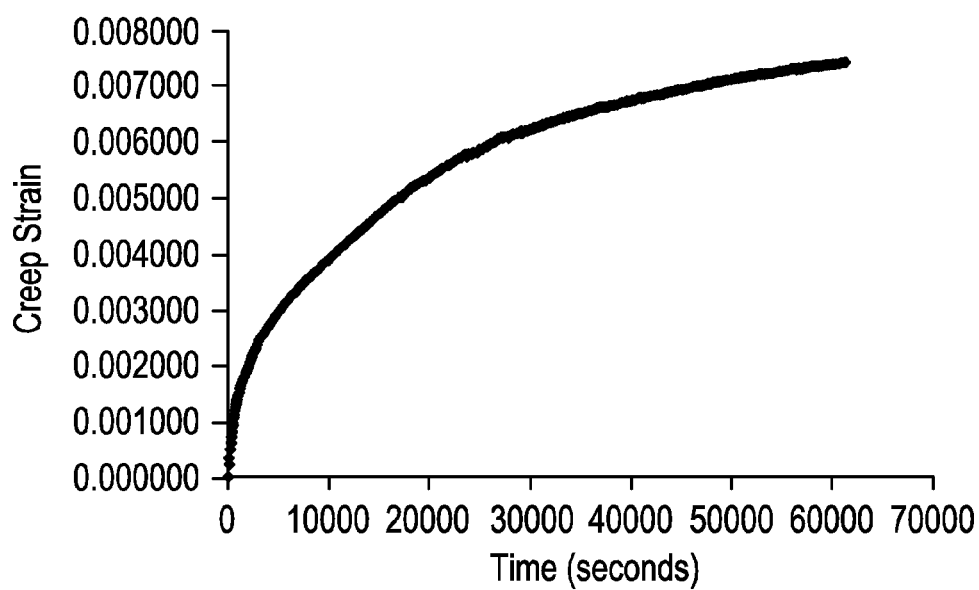
Figure 30:
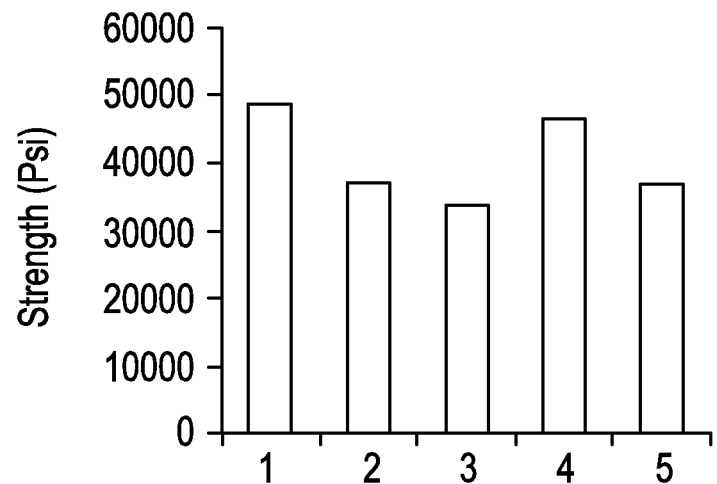
Figure 31:
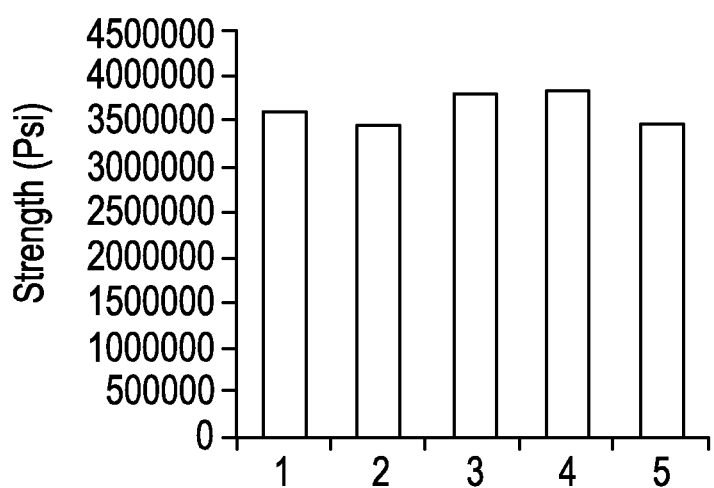
Figure 32:
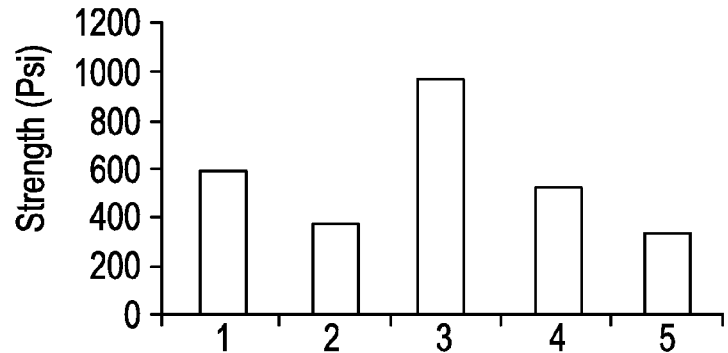
Figure 33:
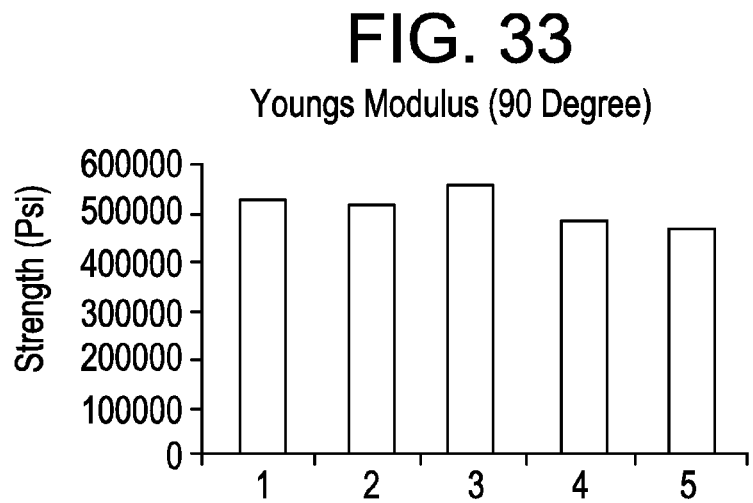
Figure 34:
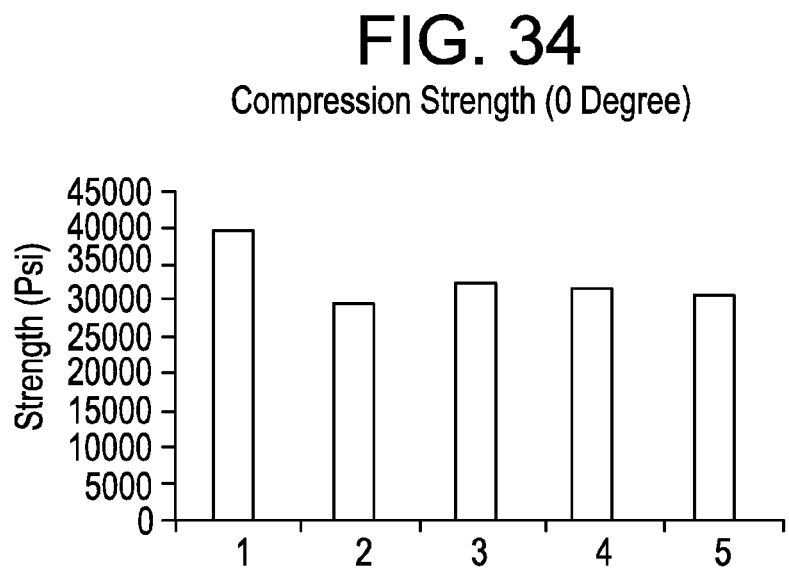
Figure 35:
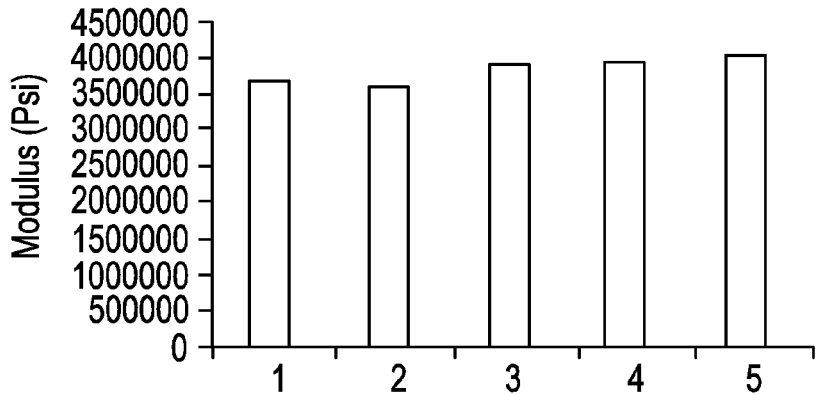
Figure 36:
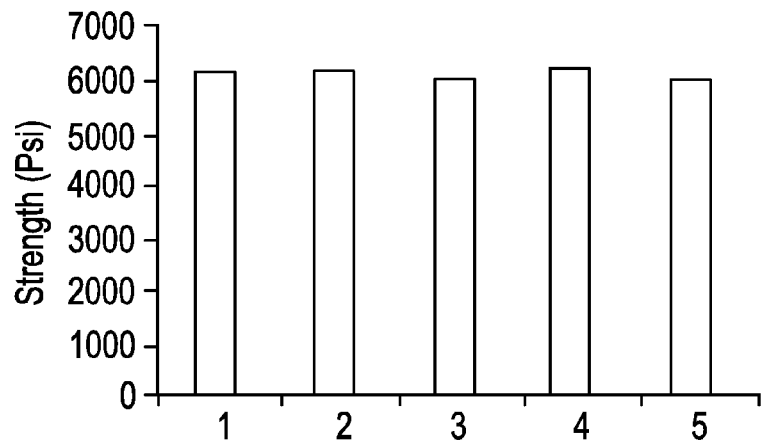
Figure 37:
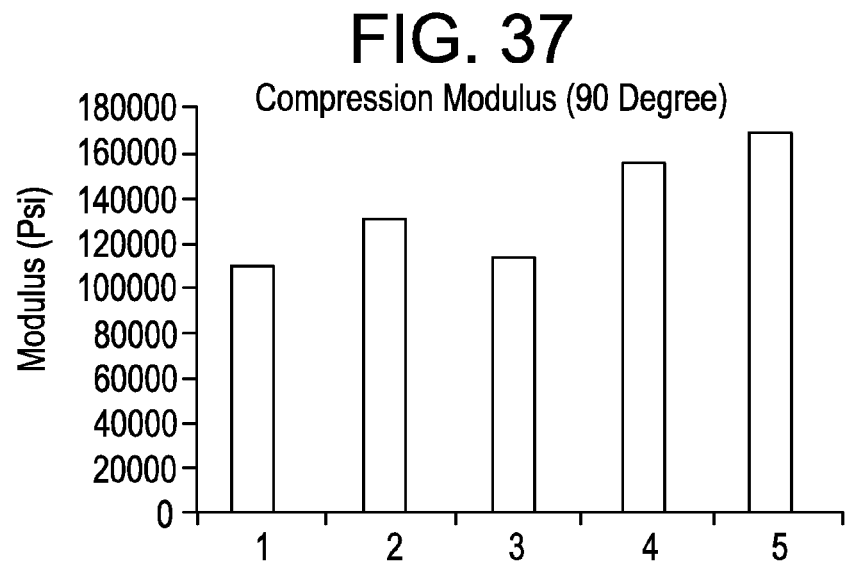
Figure 38:
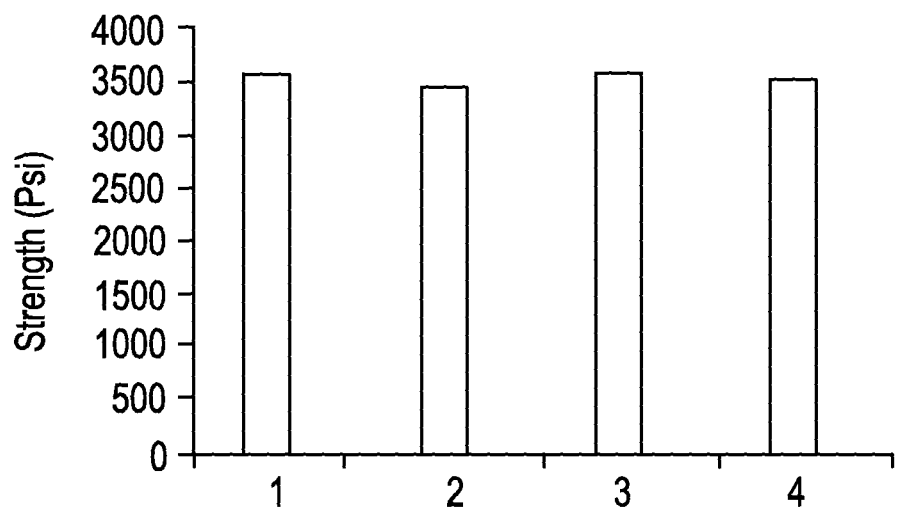
Figure 39:
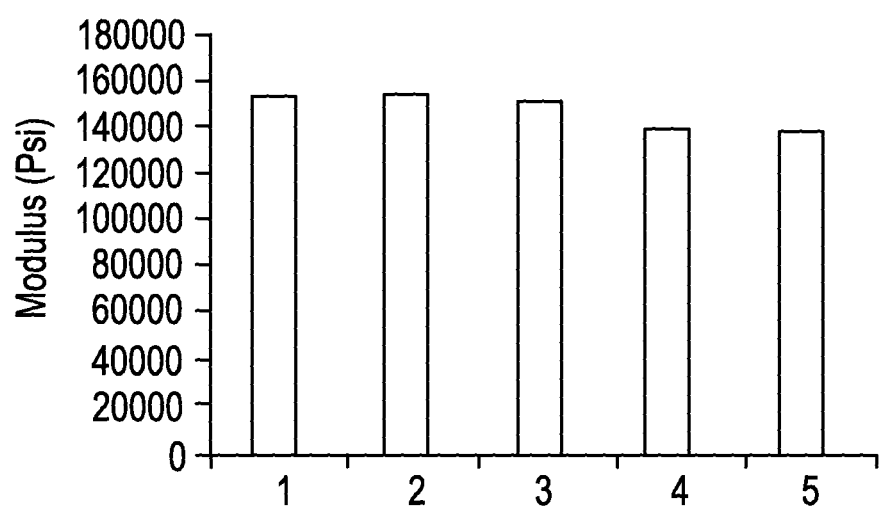
Figure 40:
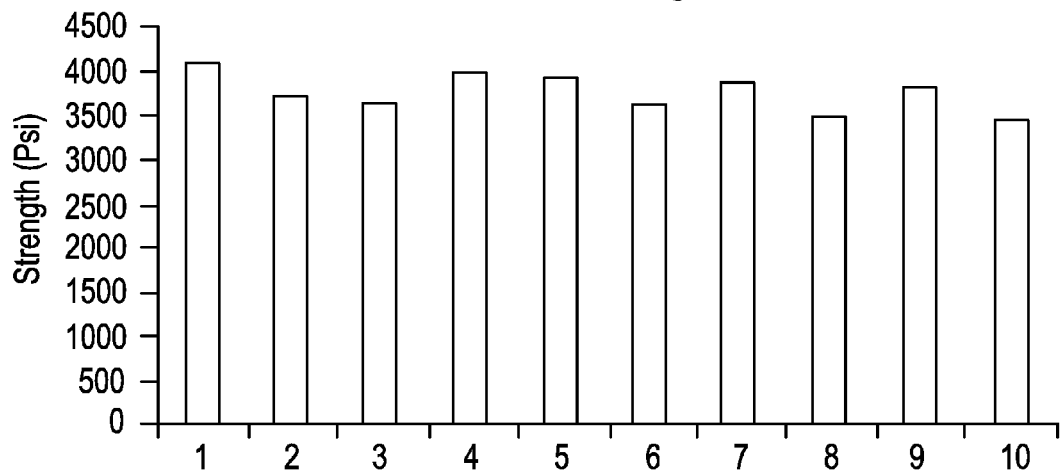
Figure 41:
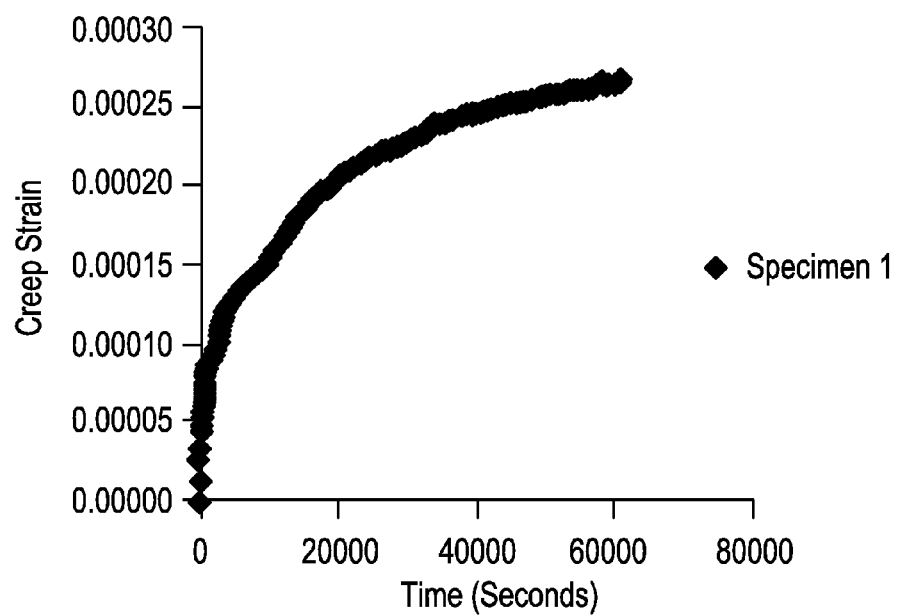
Figure 42:
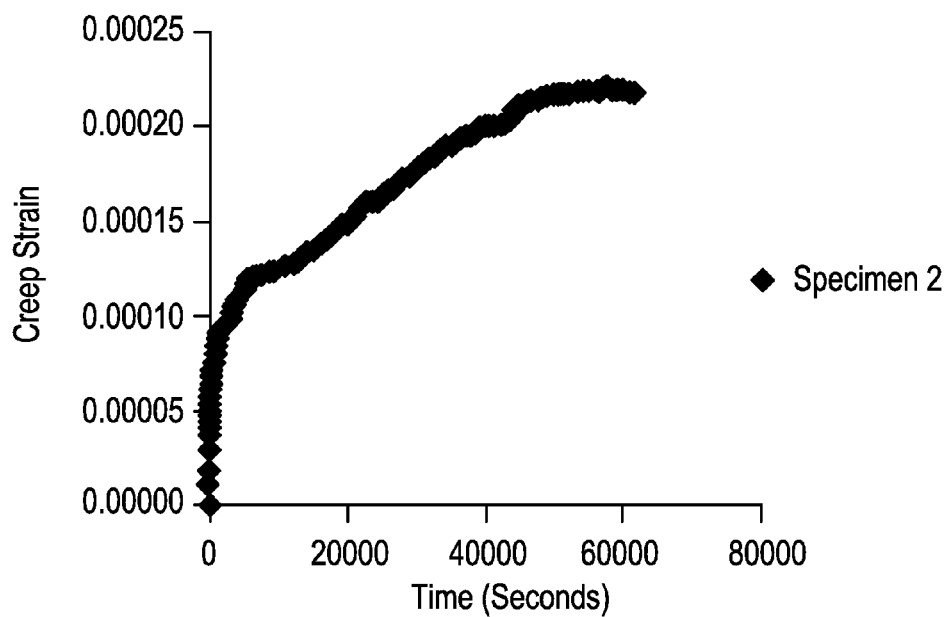
Figure 43:
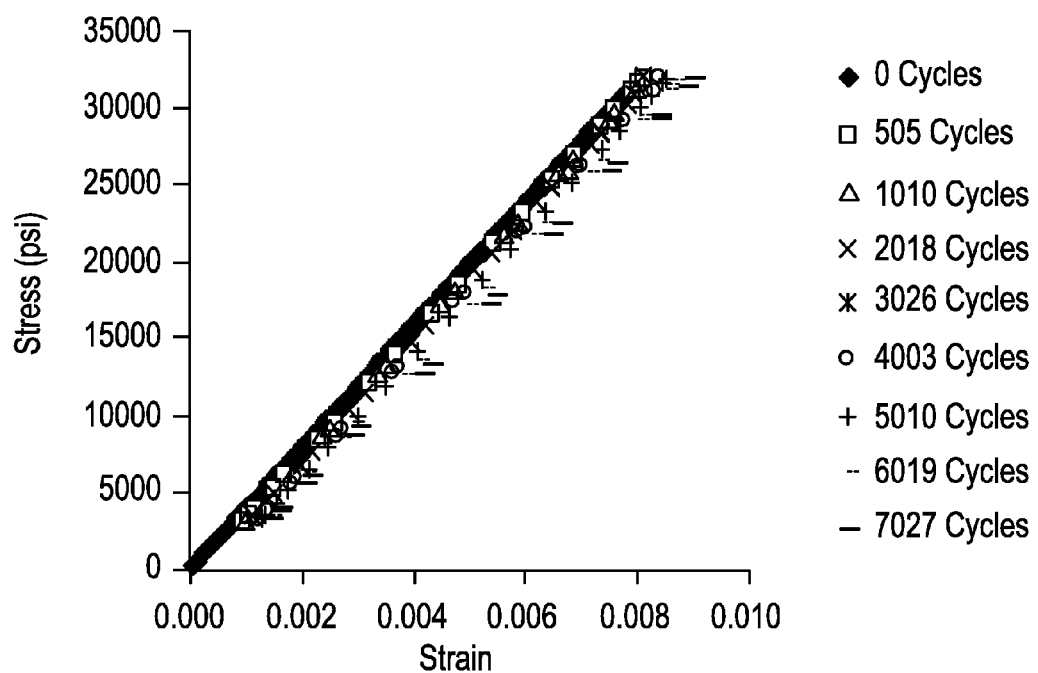

FIG. 26 schematically shows a passenger rear suspension sub-assembly construction utilizing coil springs that can be replaced by using a fiber reinforced polymeric (FRP) thermoplastic composite leaf spring/assembly, as in FIG. 27, according to embodiments;

FIG. 27 schematically shows a rear suspension sub-assembly construction comprising the fiber reinforced polymeric (FRP) thermoplastic composite leaf spring/assembly, according to embodiments;

FIG. 28 schematically shows a further embodiment of the fiber reinforced polymeric (FRP) thermoplastic composite leaf spring in curved form;

FIG. 29 depicts a graph showing creep strain versus time for testing of embodiments of the invention;

FIG. 30 depicts a graph of tensile strength (Psi) for testing of embodiments of the invention;

FIG. 31 depicts a graph of Youngs Modulus for testing of embodiments of the invention;

FIG. 32 depicts a further graph of tensile strength (Psi) for testing of embodiments of the invention;

FIG. 33 depicts a further graph of Young Modulus for testing of embodiments of the invention;

FIG. 34 is a graph depicting compression strength for testing of embodiments of the invention;

FIG. 35 is a graph depicting compression modulus for testing of embodiments of the invention;

FIG. 36 is further graph depicting compression strength for testing of embodiments of the invention;

FIG. 37 is a further graph depicting compression modulus for testing of embodiments of the invention;

FIG. 38 is graph depicting in-plane shear strength for testing of embodiments of the invention;

FIG. 39 is a graph depicting in-plane shear modulus for testing of embodiments of the invention;

FIG. 40 is a graph depicting interlaminar shear strength for testing of embodiments of the invention;

FIG. 41 is a graph depicting creep strain versus time for a specimen 1, according to embodiments of the invention;

FIG. 42 is a graph depicting creep strain versus time for a specimen 2, according to embodiments of the invention and;

FIG. 43 is a graph of stress versus strain for testing of embodiments of the invention.

DETAILED DESCRIPTION

The inventors have determined the composite leaf springs disclosed herein comprised of fiber reinforced polymeric (FRP) materials, particularly fiber reinforced thermoplastic materials, can provide much higher energy storage per unit mass and therefore a much lighter assembly than, e.g., traditional steel leaf springs. In addition, the fiber reinforced composite leaf springs and assemblies disclosed herein transmit less noise than steel leaf springs, and require less damping force to maintain control under operating conditions.

Thus, the polymer matrix from which the polymeric composite and/or composite layers thereof are manufactured comprises a thermoplastic matrix material, according to embodiments.

Particles or fibers that are embedded in the polymer matrix material to form the thermoplastic composite material can include, but are not limited to, carbon, glass, Kevlar® fiber, aramid fibers, combinations of the foregoing, and the like that are embedded in the polymer matrix material to form the polymer composite material. In addition to the above-described particles and fibers, iron particles can also be incorporated into the composite material disclosed herein. In this manner the above-described plies that form the layers of can be inductively heated thereby causing the plies of material to bond and/or cure together.

According to embodiments, fiber reinforced thermoplastic composite leaf springs may generally be comprised of a combination of thermoplastic matrix materials, high strength reinforcing fibers and other reinforcing materials. The thermoplastic matrix material may comprise any material or combination of materials of a thermoplastic nature suitable for the application including, but not limited to: polyvinylidene fluoride (PVDF) which can desirable impart fire resistance properties to the resultant composite materials, polyamide (nylon), polyethylene, polypropylene, polyethylene terephthalate, polyphenylene sulfide, polyetheretherketone, and other thermoplastic polymers and combinations thereof. The polymeric matrix material may preferably utilize higher molecular weight polyethylene such as ultra-high-molecular-weight polyethylene (UHMWPE) and high-density cross-linked polyethylene (HDXLPE) and in certain lower performance applications other polyethylenes may be used such as cross-linked polyethylene (PEX or XLPE), medium-density polyethylene (MDPE), linear low-density polyethylene (LLDPE), and very-low-density polyethylene (VLDPE).

Thermoplastic loading by weight can vary widely depending on physical property requirements of the intended use of the product sheet. A composite material may contain about 50 to about 15 wt % thermoplastic matrix, more preferably about 40 to about 20 wt % and most preferably, about 30 to about 25 wt % of thermoplastic matrix material, by weight of thermoplastic matrix material plus fibers.

The reinforcing fibers used may include, but are not limited to, glass fibers (such as E-glass and S-glass), aramid fibers (KEVLAR®), carbon fibers, and other high strength fibers and combinations thereof. Other fibers may also be incorporated, preferably in combination with E-glass and/or S-glass, but optionally instead of E- and/or S-glass. Such other fibers include ECR, A and C glass, as well as other glass fibers; fibers formed from quartz, magnesia alumuninosilicate, non-alkaline aluminoborosilicate, soda borosilicate, soda silicate, soda lime-aluminosilicate, lead silicate, non-alkaline lead boroalumina, non-alkaline barium boroalumina, non-alkaline zinc boroalumina, non-alkaline iron aluminosilicate, cadmium borate, alumina fibers, asbestos, boron, silicone carbide, graphite and carbon such as those derived from the carbonization of polyethylene, polyvinyl-alcohol, saran, aramid, polyamide, polybenzimidazole, polyoxadiazole, polyphenylene, PPR, petroleum and coal pitches (isotropic), mesophase pitch, cellulose and polyacrylonitrile, ceramic fibers, metal fibers as for example steel, aluminum metal alloys, and the like.

Where high performance is required and cost justified, high strength organic polymer fibers formed from an aramid exemplified by Kevlar may be used. Other preferred high performance, unidirectional fiber bundles generally have a tensile strength greater than 7 grams per denier. These bundled high-performance fibers may be more preferably any one of, or a combination of, aramid, extended chain ultra-high molecular weight polyethylene (UHMWPE), poly [p-phenylene-2,6-benzobisoxazole] (PBO), and poly[diimidazo pyridinylene (dihydroxy) phenylene].

In addition, materials such as metals, e.g., aluminum, steel, and other ferrous and/or non ferrous metals, plastics, epoxies, composites, and/or other suitable materials may be used as reinforcements, additives or inserts to impart specific mechanical, dimensional or other physical properties either uniformly throughout the spring, or in specific regions of the spring.

It is noted that a particularly suitable combination of materials for a composite leaf spring according to embodiments is a Nylon matrix reinforced with E-glass fibers.

Various constructions and configurations of leaf springs and assemblies, according to embodiments, are set forth below. It is noted that advantageously with respect to the following descriptions and embodiments, any or all of the components of the leaf spring and/or assemblies can be made of the afore-described fiber reinforced polymeric (FRP) composite materials and optional additional reinforcements, and in any combination of materials thereof.

Figure 1:
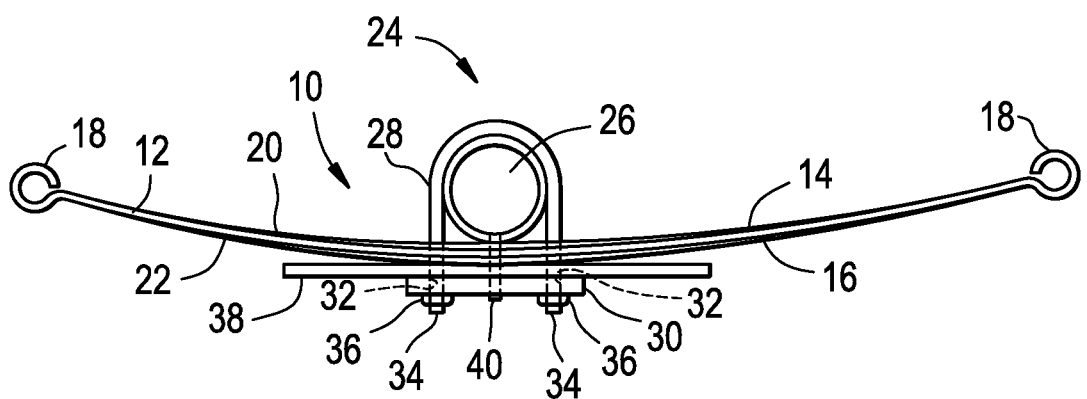

With reference to FIG. 1, a hybrid leaf spring in accordance with a first embodiment of the present invention is generally designated by the reference number 10. The hybrid leaf spring 10 includes an elongated primary leaf 12 having a first modulus of elasticity, a tension surface 14, an opposing compression surface 16, and mounting sections 18, shown as, but not limited to, mounting eyes formed integrally with the ends of the elongated primary leaf 12 for coupling the primary leaf 12 to a vehicle frame. The elongated primary leaf 12 is formed from a suitable material, such as but not limited to metal, e.g., steel. Alternatively, the primary leaf 12 may be fabricated from a metal-matrix-composite material which can include a plurality of fibers imbedded in a metallic matrix. Still further, the primary leaf 12 may be made of the afore-described fiber reinforced polymeric (FRP) composite materials and optional additional reinforcements, and in any combination of materials thereof.

At least one layer of composite material generally, but not limited to, having an elastic modulus lower than the material of the primary leaf 12, is disposed substantially parallel to and bonded to the tension surface 14 and the compression surface 16 of the primary leaf 12. At least one layer of composite material is preferably formed from a plurality of substantially parallel fibers embedded in a polymeric matrix. As shown in FIG. 1, a first layer of composite material 20 is bonded to the tension surface 14 of the primary leaf 12, and a second layer of composite material 22 is bonded to the compression surface 16 of the primary leaf 12.

The hybrid leaf spring 10 is typically fabricated by bonding the first layer of composite material 20 and the second layer of composite material 22 to the primary leaf 12 and placing the assembled components in a press employing a heated die having a shape conforming to the desired unloaded shape of the finished hybrid leaf spring. The components are then pressed together and through the combination of heat and pressure hybrid leaf springs of consistent repeatable shape can be formed. However, the present invention is not limited in this regard as other fabrication techniques known to those skilled in the pertinent art, such as molding, may be employed.

A clamping means 24 is employed to couple the leaf spring 10 in a three-point configuration to an axle 26 of a vehicle, according to embodiments. In the illustrated embodiment, the clamping means 24 includes a pair of U-bolts 28 extending around the axle 26 with the leaf spring 10 being received between the U-bolts. A locking plate 30 defining two pairs of apertures 32 for receiving ends 34 of the U-bolts 28 is positioned adjacent to the second layer of composite material 22 and fasteners 36 are threadably engaged with the ends of the U-bolts for releasably clamping the U-bolts and the leaf spring 10 onto the axle 26. In addition, a load leaf 38 for enhancing the load carrying capacity of the leaf spring 10 in the area of highest stress is interposed between the second layer of composite material 22 and the locking plate 30. The load leaf 38 can be bonded to the second layer of composite material 22 or it can be retained in contact with the second layer of composite material by the clamping means 24. The load leaf 38 can be either curved or flat, and may or may not vary in cross-section and be constructed of, e.g., a metallic and/or a composite material.

In order to properly position the leaf spring 10 along the axle 26, a positioner 40 is engaged with the axle 26, according to embodiments, and in the illustrated embodiment of FIG. 1 extends through the leaf spring 10, the load leaf 38, and the locking plate 30 and into the axle 26 thereby fixing the position of the leaf spring 10 relative to the axle 26. The positioner 40 may take various forms, and in the illustrated embodiment is a pin; however, a bolt and so forth can also be used without departing from the scope of the present invention.

Advantageously, the inventors have herein determined that one or all of the components of the leaf spring 10 of FIG. 1 can be made of the afore-described fiber reinforced polymeric (FRP) material.

Figure 2:
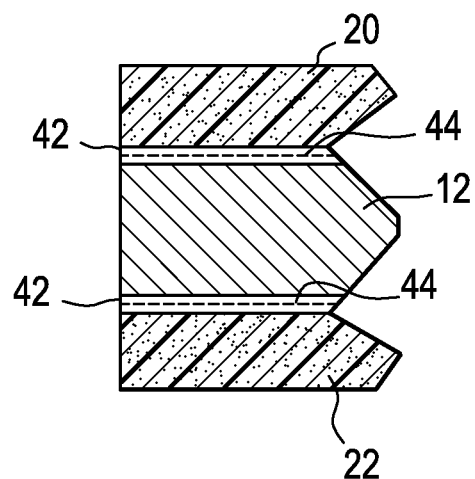

As shown in FIG. 2, to increase bond strength, adhesive layers 42 are interposed between the primary leaf 12 and each of the first and second composite layers 20, 22 each including a reinforcing layer of sheet material 44, schematically indicated by dashed lines, disposed within the adhesive layer 42. Each adhesive layer 42 is preferably a thermoset epoxy adhesive, but may be other types of adhesive without departing from the scope of the present invention. For example, the adhesive may be traditional one or two part liquid structural adhesives such as epoxies, or may be urethanes and thermoplastics.

Figure 3:
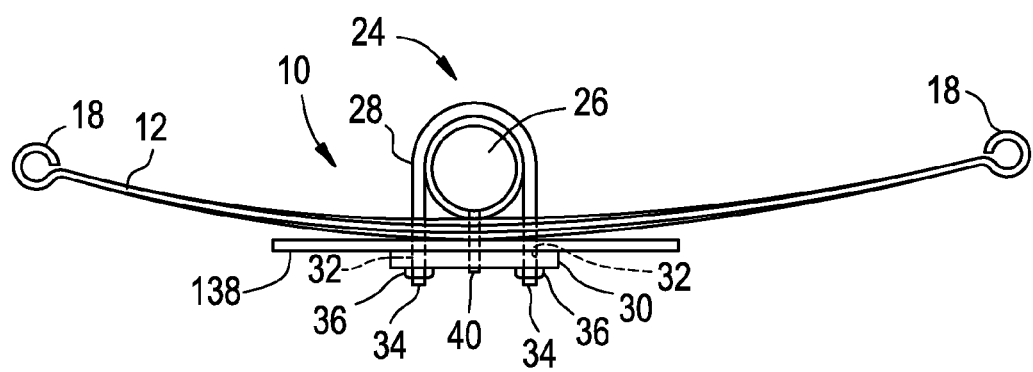
Figure 3A:
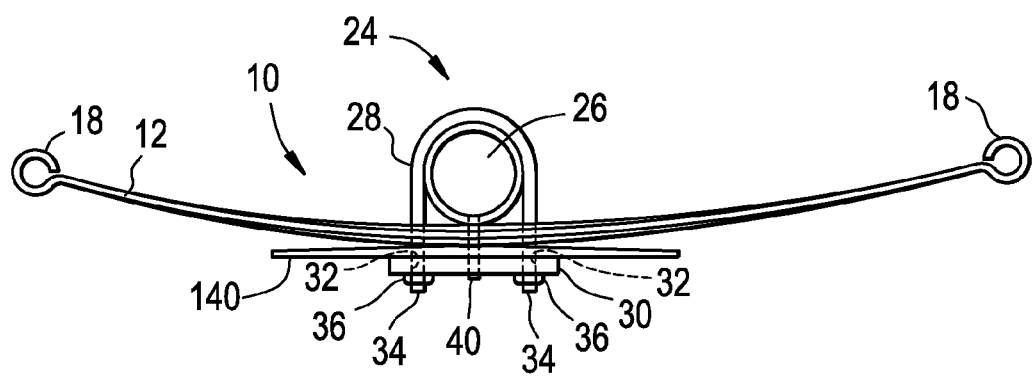

Another embodiment is shown in FIG. 3 in which previously described elements bear the same reference numerals. In this embodiment, the primary leaf is, e.g., a conventional steel primary leaf without composite layers and the second stage load leaf 138 is a flat fiber reinforced polymeric (FRP) composite structure, according to embodiments, and provides for enhancing the load carrying capacity of the leaf spring 10 in the area of highest stress. FIG. 3A shows a similar leaf spring assembly where the second stage leaf 140 is a curved FRP composite structure of the invention, providing enhanced secondary support of the primary leaf spring with reduced weight and customized secondary spring characteristics which are desirable in certain heavy duty applications.

Figure 4:
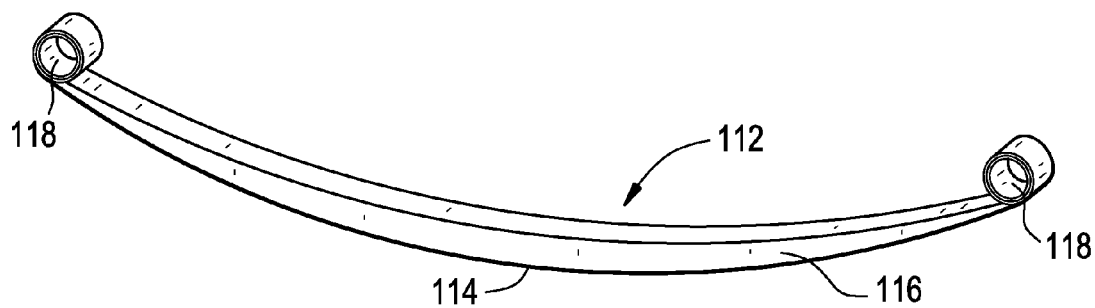

FIG. 4 shows an embodiment of the invention comprising a leaf spring 112 made of the afore-described fiber reinforced polymeric (FRP) thermoplastic composite material of the invention with circular eyes 118 at each end for attachment to a vehicle chassis. The eyes 118 may, e.g., be steel or other metal inserts molded and anchored in the composite body 116 or they may be specially designed composite structures with wound continuous high strength fibers forming the eye in the composite structure, such as comprising the FRP thermoplastic composite materials disclosed herein. The spring also has a mounting area 114, usually at or near the midpoint between the circular eyes 118, designed to attach to an axle of the vehicle via a clamping mechanism, and with or without use of a sleeve.

As an alternative to the depicted circular eyes 118 of FIG. 4, a linkage could be employed to secure the structure. Still further, one eye 118 could be employed on an end of the leaf 112 with the other end of leaf 112 comprising a flat construction instead of a second eye 118.

By way of illustration only, leaf spring 112 could be usable in replacement of a primary leaf spring 12 in the configuration as shown in FIG. 1, thus potentially providing weight savings and customizable spring characteristics by modification of the types of reinforcement and layer configuration chosen for a given application. It could also serve as a single stage leaf spring alone where no second stage supplemental support is necessary in the application. Such applications may include light trailer application and so forth.

Accordingly, composite leaf springs in accordance with embodiments herein, may utilize a single leaf design, as shown in, e.g., FIG. 4, or a multiple stage leaf designs such as, e.g., the leaf spring assemblies, as shown in FIG. 1, FIG. 3 and FIG. 3A.

According to embodiments, other components may be used as structural and/or locating members of the suspension, and the leaf spring can be used only as, e.g., an energy storage device, in which case the leaf spring may or may not employ mounting eyes at the end(s) of the spring.

Figure 5:
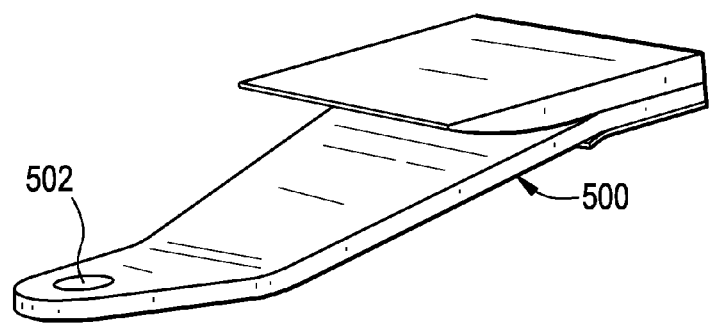
Figure 5A:
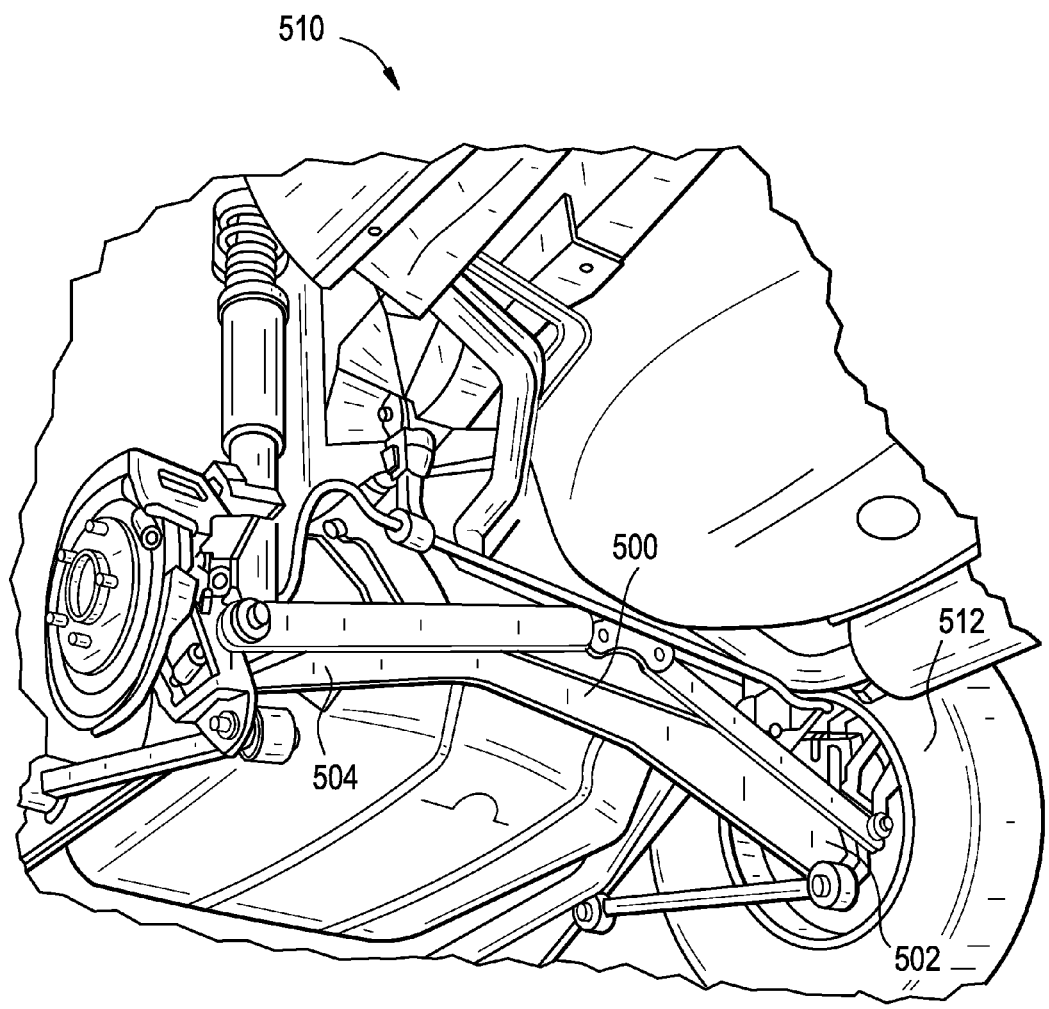

In some configurations, such as shown in FIG. 5 and FIG. 5A, embodiments of the invention may be employ a composite control arm 500, which is shown in FIG. 5 in a rising rate mounting configuration. The composite structure has a mounting hole 502 in the control arm for attachment to the unsprung portion of the suspension. As shown in FIG. 5A, it may be mounted transversely in the vehicle (not shown), such that the longitudinal axis of the leaf spring is mounted perpendicular to the fore-aft centerline of the vehicle. The composite structure may have a mounting hole 502 in the control arm for attachment to the unsprung (e.g., unloaded, without vehicle weight) portion of the suspension. The center of the leaf spring 504 is attached to the chassis 510, and each end acts independently, effectively as a cantilever spring, for example, upon the suspension of the vehicle, usually connected directly or via a linkage to the structural members controlling the action of an individual wheel and tire assembly 512 on the vehicle. In this embodiment the spring may also function as a structural or locating member of the suspension in addition to being an energy storage device. Embodiments may alternatively utilize a circular eye (not shown) which could be integrally molded into the composite structure at one or both ends of the leaf spring as an interface with the suspension. The embodiment shown in FIG. 5 has a mounting hole 502 for the end mounted to the unsprung portion of the suspension. It is noted that any or all of the components depicted in the embodiments of FIG. 5 and FIG. 5A can advantageously comprise the afore-described fiber reinforced polymeric (FRP) composite material and reinforcements, for obtaining a high strength, light weight structure and/or assembly.

Figure 6:
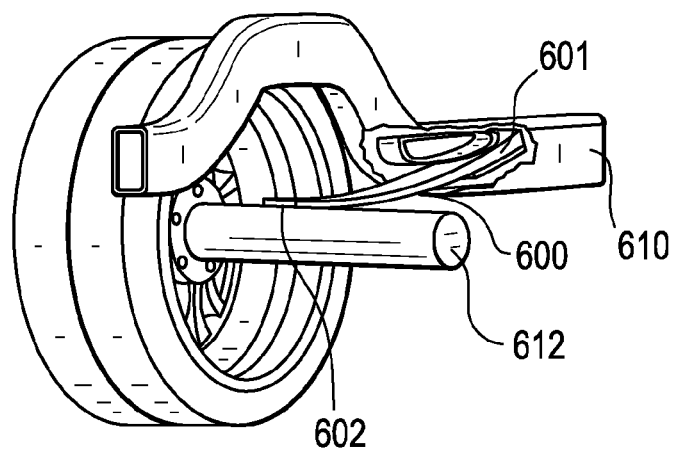
Figure 7:
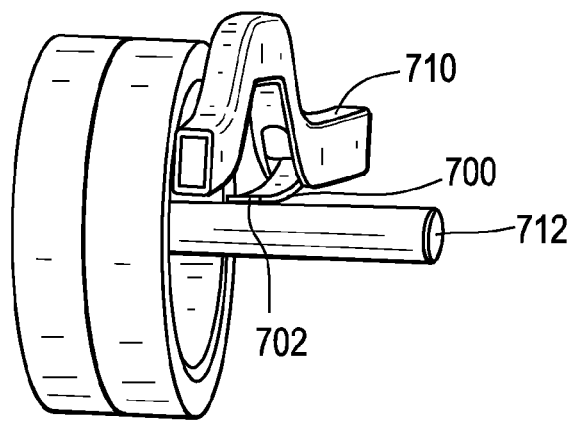
Figure 8:
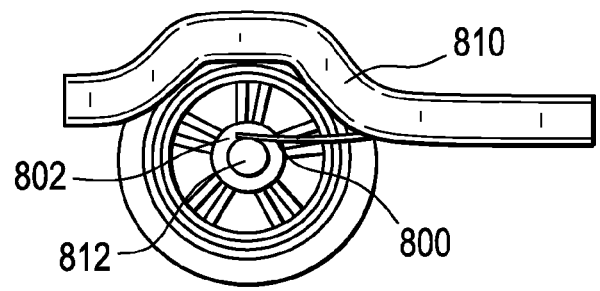

In additional configurations, shown in FIGS. 6, 7 and 8, a composite leaf spring 600, according to embodiments, may be used in a rear suspension cantilever-in frame-assembly, where one end 601 of the assembly is constrained in the chassis 610, 710, 810 and the other end 602, 702, 802 acts upon the suspension in an energy storage capacity. The composite leaf spring 600 of FIG. 6 is shown as a multi-stage leaf spring. Composite leaf springs 700 and 800 of FIGS. 7 and 8, respectively, are shown as a single stage leaf spring for even lighter weight applications. It is further noted that embodiments may also use the composite leaf springs disclosed herein as locating or structural devices, and may not necessarily employ a circular eye at either end of the leaf spring as shown in FIGS. 6, 7 and 8 where the end is fixed to the axle 612, 712, 812.

FIG. 9 shows front prospective views of five types/configurations of leaf springs which can comprise the afore-described fiber reinforced polymeric (FRP) composite leaf spring components/compositions and optional additional reinforcements of embodiments of the invention disclosed herein, and in any combination, for any or all of the leaf spring components.

By way of illustration, a standard spring 902 is initially shown in FIG. 9A, wherein, according to embodiments, any or all of the components of FIG. 9A could advantageously comprise the FRP thermoplastic composite composition and optional reinforcements disclosed herein.

Figure 9B:
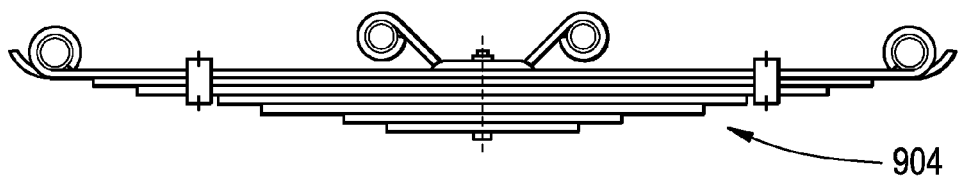

FIG. 9B depicts an eye mounted spring 904, according to embodiments, having a center mounting which is flexible, wherein any or all of its components comprise fiber reinforced thermoplastic composite elements.

Figure 9C:
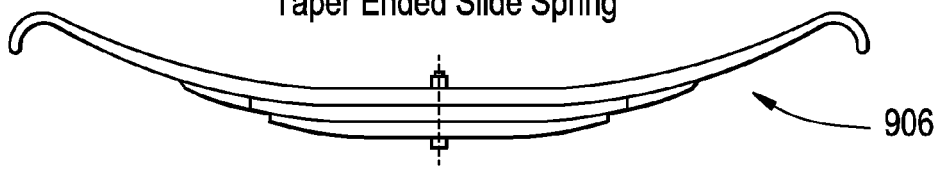

FIG. 9C depicts a taper ended slide spring 906, according to embodiments, without eye attachments, and similarly having fiber reinforced thermoplastic composite elements for any one or all of its components.

Figure 9D:
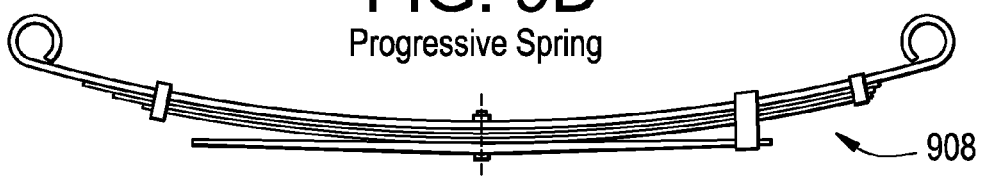

The progressive spring 908 of FIG. 9D, according to embodiments, is similar to the springs described above with respect to FIGS. 1, 3 and 3A, and also comprises fiber reinforced thermoplastic composite elements for any or all of its components.

Figure 9E:
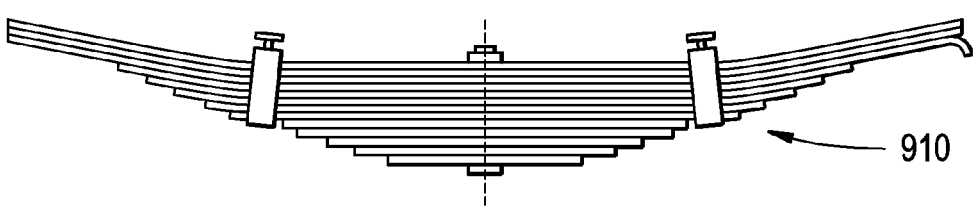

A heavy duty trailer spring 910 is shown in FIG. 9E, according to embodiments, which similarly can have any or all of its leaf components as fiber reinforced thermoplastic composite structural elements, as described herein.

Figure 10:
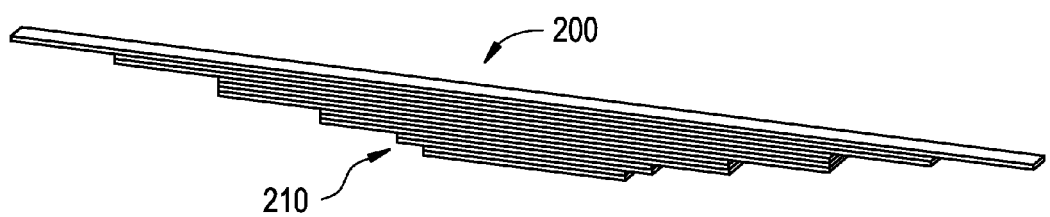

Referring now to FIGS. 10-18, depicted therein are various configurations of composite leaf springs, according to embodiments. As in the case of the embodiments previously described herein, some or all of the components of each of FIGS. 10-18 advantageously comprise the afore-described fiber reinforced polymeric (FRP) thermoplastic composite materials with optional reinforcements. For example, FIG. 10 is a schematic illustration of a composite leaf spring 200, according to embodiments, comprising stacked, successive layers 210 forming a tapered profile. It is noted that while the embodiment of FIG. 10 is depicted without, e.g., circular eyes, such features could be included therein. This is also the case for other embodiments disclosed herein without the circular eye features particularly depicted. Moreover, it is further noted that the layering or stacking of the various embodiments disclosed herein could also be replaced with a composite plate comprising the FRP thermoplastic materials disclosed herein, and coupled with mechanical fasteners to, e.g., secure a primary stage leaf to a second stage leaf, and so forth.

Figure 11:
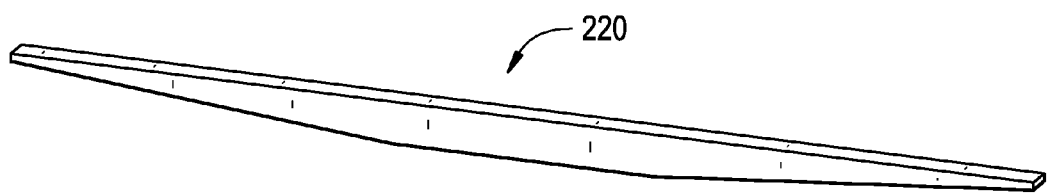

FIG. 11 is a schematic illustration of a composite leaf spring 220, according to embodiments, showing a tapered spring profile obtained after successive layers, such as the layers 210 of FIG. 10, are heated and consolidated.

Figure 12:
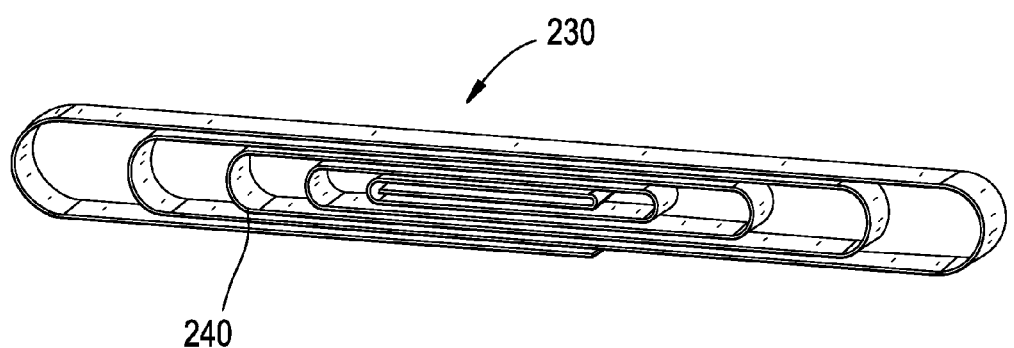

FIG. 12 is a schematic illustration of a composite leaf spring 230, according to embodiments, comprising wrapped, successive layers 240. It is noted that this embodiment can be employed as a preform comprising the afore-described FRP thermoplastic material, which is then heated and consolidated into the desired final form.

Figure 13:
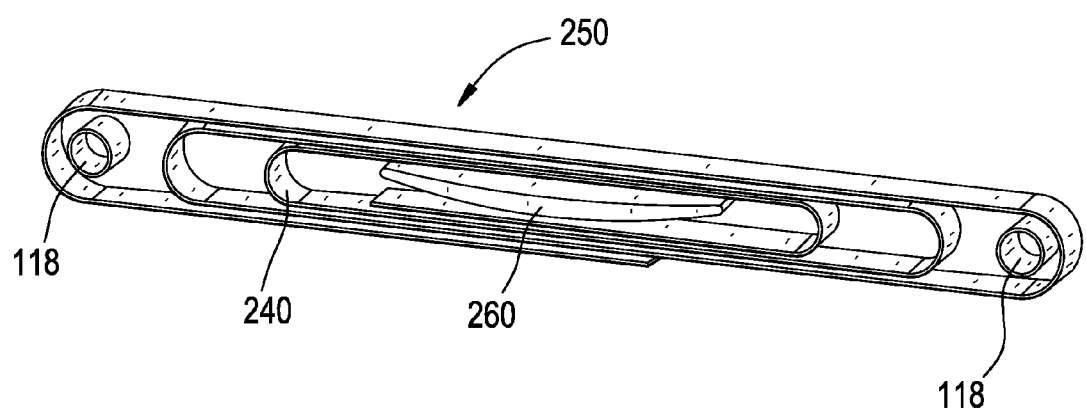

FIG. 13 is a schematic illustration of a composite leaf spring 250, according to embodiments, comprising wrapped, successive layers 240, attachment eyes 118 and an insert 260. As in the case of the other various embodiments disclosed herein, all or some of the components of the depicted composite leaf spring can comprise the afore-described FRP thermoplastic material. According to embodiments, the curved insert 260 depicted therein could also be in other desired shapes, such as flat and so forth, and also be made of a metal, such as steel. The structure of FIG. 13 can also be employed as a preform, which is then heated and consolidated achieve, e.g., the structure 270 depicted in FIG. 14.

Figure 14:
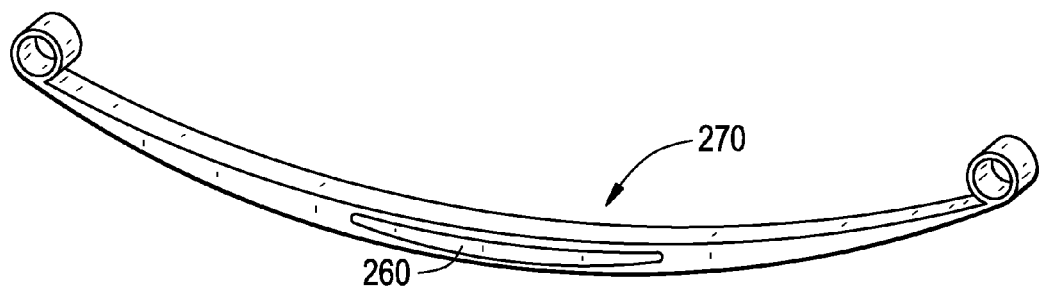

FIG. 14 is a schematic illustration of a composite leaf spring 270, according to embodiments, comprising heated and consolidated successive layers, attachment eyes 118 and an insert 260, and depicted in a curved profile obtained after the layers are heated and consolidated. It is noted that to, e.g., reduce the use of material for the structure, the depicted insert 260 could alternatively be an open spacer, according to embodiments.

Figure 15:
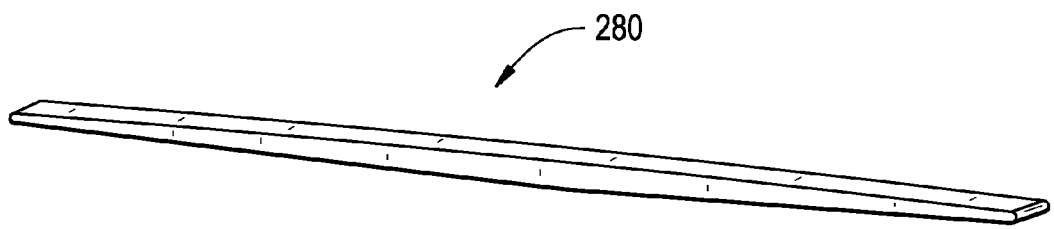

FIG. 15 is a schematic illustration of a composite leaf spring 280, according to embodiments, showing a tapered spring profile obtained after wrapped layers are heated and consolidated. It is noted that this embodiment, as well as the other embodiments disclosed herein, could be employed as both a second and a third stage of a multi-stage leaf construction.

Figure 16:
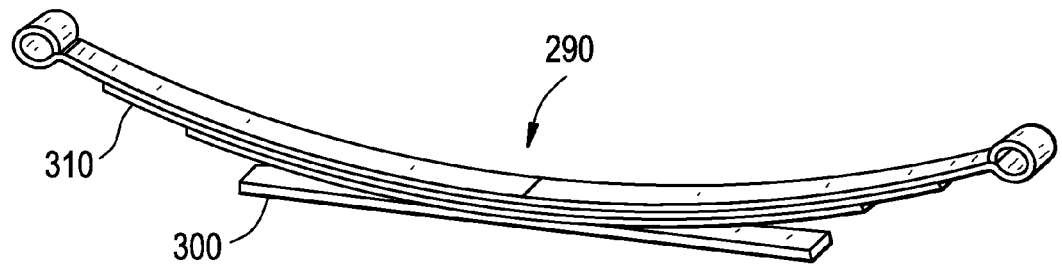

FIG. 16 is a schematic illustration of a perspective view of a multi-leaf spring 290, according to embodiments, comprising a flat, fiber reinforced composite second stage 300. It is noted that three plates 310 are depicted therein as part of the primary leaf construction, however, more or less plates could be employed as needed.

Figure 17:
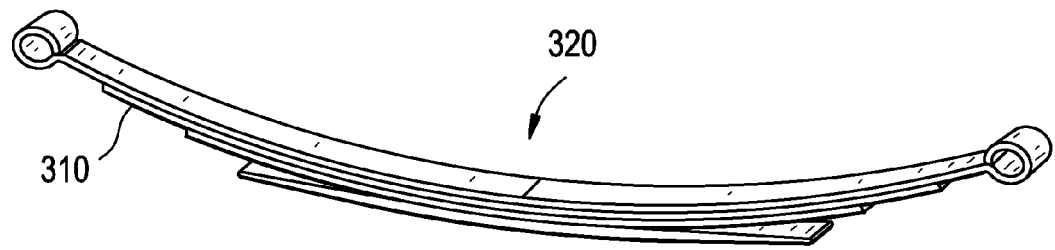

FIG. 17 is a schematic illustration of a perspective view of a multi-leaf spring 320, according to embodiments, comprising a curved, fiber reinforced composite second stage. It is noted that three plates 310 are depicted therein as part of the primary leaf construction, however, more or less plates could be employed as needed.

Figure 18:
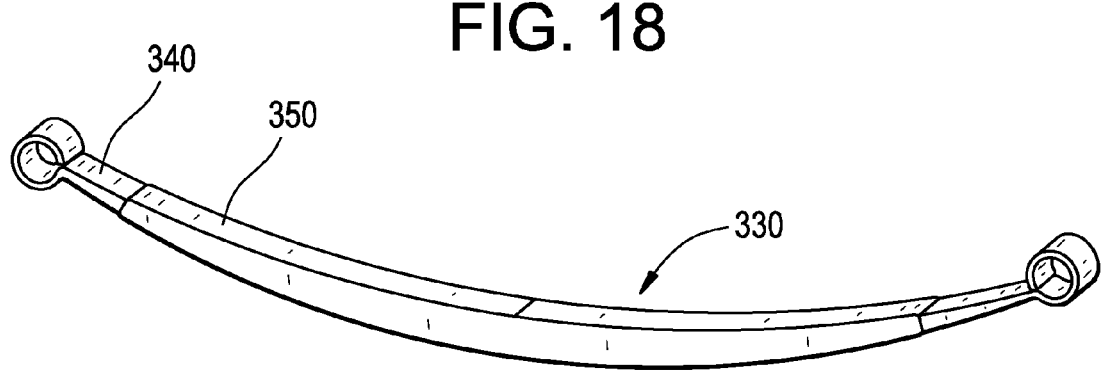

FIG. 18 is a schematic illustration of a perspective view of a composite leaf spring 330, according to embodiments, comprising a hybrid leaf including, e.g., a metal main leaf 340 with fiber reinforced thermoplastic composite material disclosed herein as cladding 350.

Figure 19A:
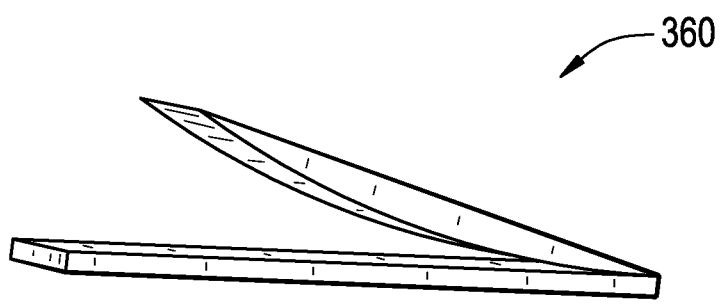
FIG. 19 illustrates schematically at FIGS. 19A and 19B a composite leaf spring, according to embodiments, comprising the fiber reinforced polymeric (FRP) thermoplastic materials disclosed herein and particularly shown in a cantilever configuration, actuating against a curved form.
Figure 19B:
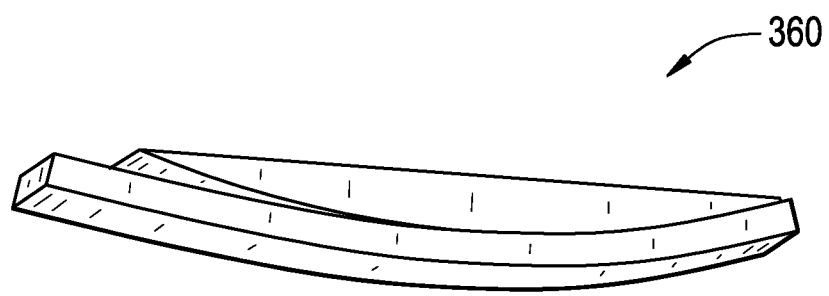

The inventors have further determined how to efficiently employ the fiber reinforced polymeric (FRP) thermoplastic material disclosed herein in various configurations to control the shape (e.g., curvature) of the structure under loading. For example, a radial form may be utilized thereby providing a progressive rate increase. Opposing couples at both ends of the structure could be employed, with additional linkages, to provide desired bending. Moreover, the structure could be made with a constant stress profile using, e.g., additional machining. By way of further illustration, FIGS. 19A and 19B depicts a composite leaf spring 360, according to embodiments, comprising the fiber reinforced polymeric (FRP) thermoplastic materials disclosed herein and particularly shown in a cantilever, curved form. It is noted that the curved form can control stress levels and provide rate progression.

Figure 20A:
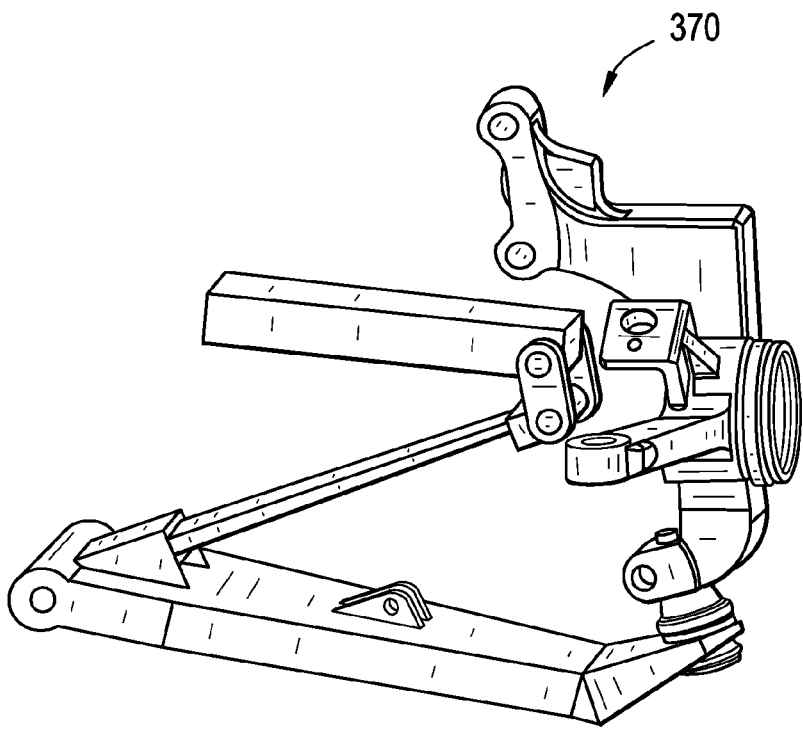
FIG. 20 illustrates schematically at FIGS. 20A and 20B a floating cantilever construction, according to embodiments.
Figure 20B:
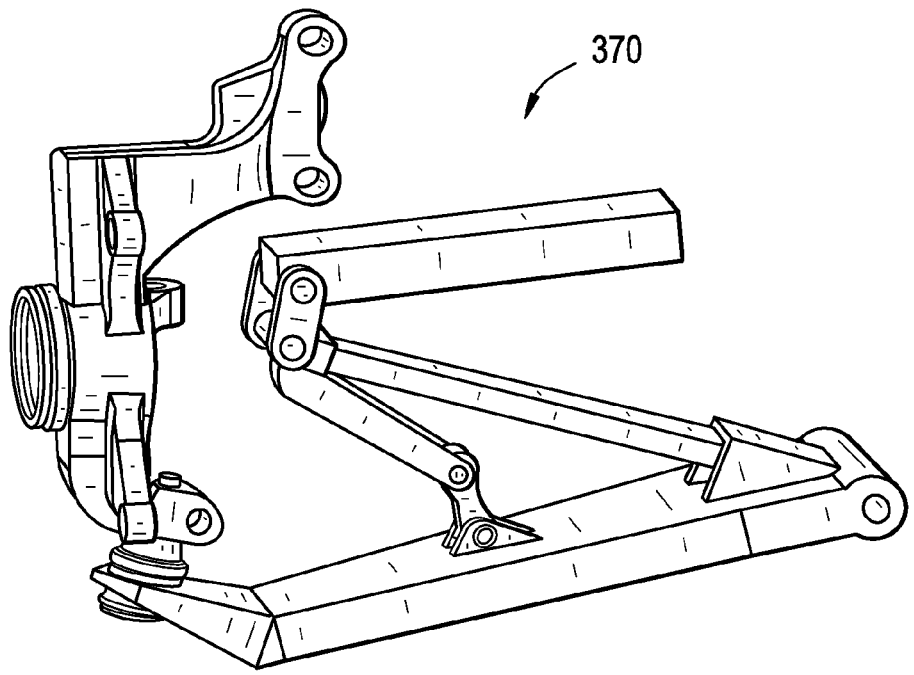

FIG. 20 depicts at FIGS. 20A and 20B a floating cantilever construction 370, according to embodiments, wherein the cantilever is loaded by a couple applied to one end. Additional linkage may be used to apply an opposing couple to a shackled end, inducing pure bend loading.

Figure 21:
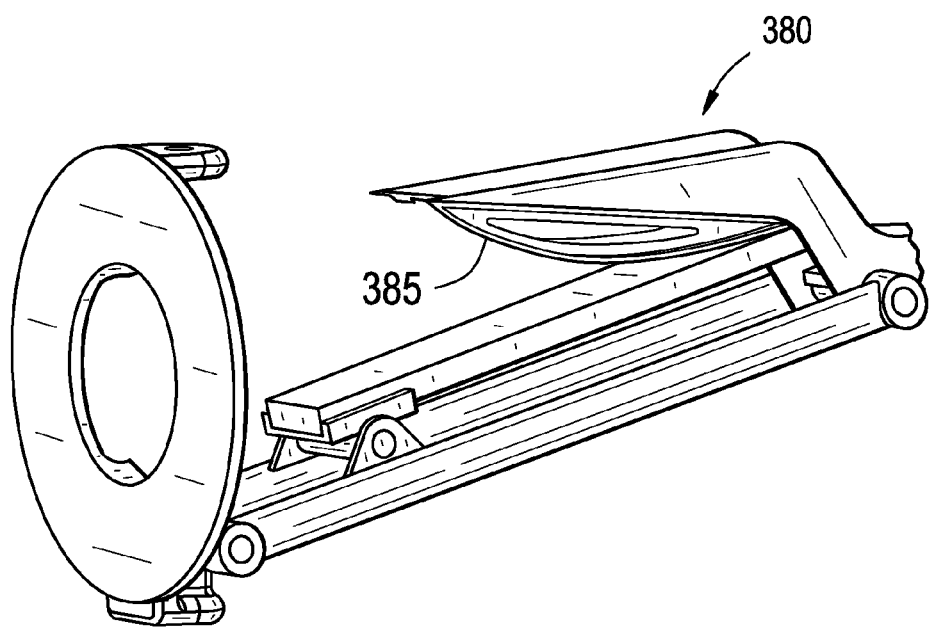
FIG. 21 is a schematic illustration of a multi-link composite leaf assembly, according to embodiments.

FIG. 21 depicts a multi-link composite leaf assembly 380 wherein the linkage is used to control the geometry. In this embodiment, the cantilever spring 385 is actuated directly by the linkage.

Figure 22:
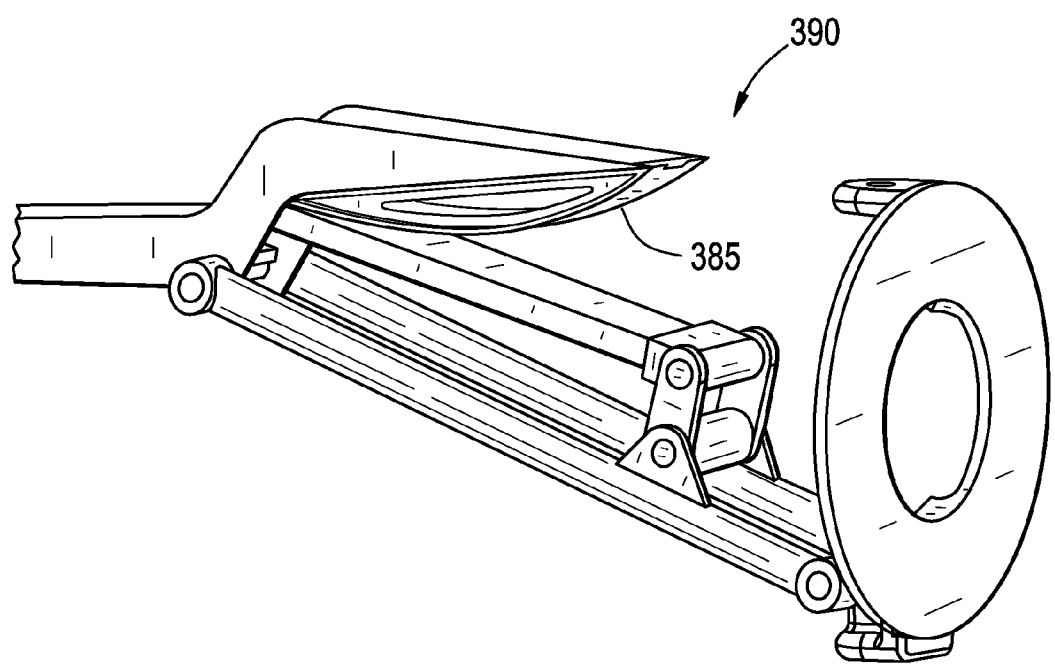
FIG. 22 is a schematic illustration another multi-link composite leaf assembly, according to embodiments.

Similarly, FIG. 22 depicts another multi-link composite leaf assembly 390 wherein the linkage is used to control the geometry. In particular, the cantilever spring 385 is actuated via the shackle assembly thereby allowing tuning rate progression.

Figure 23:
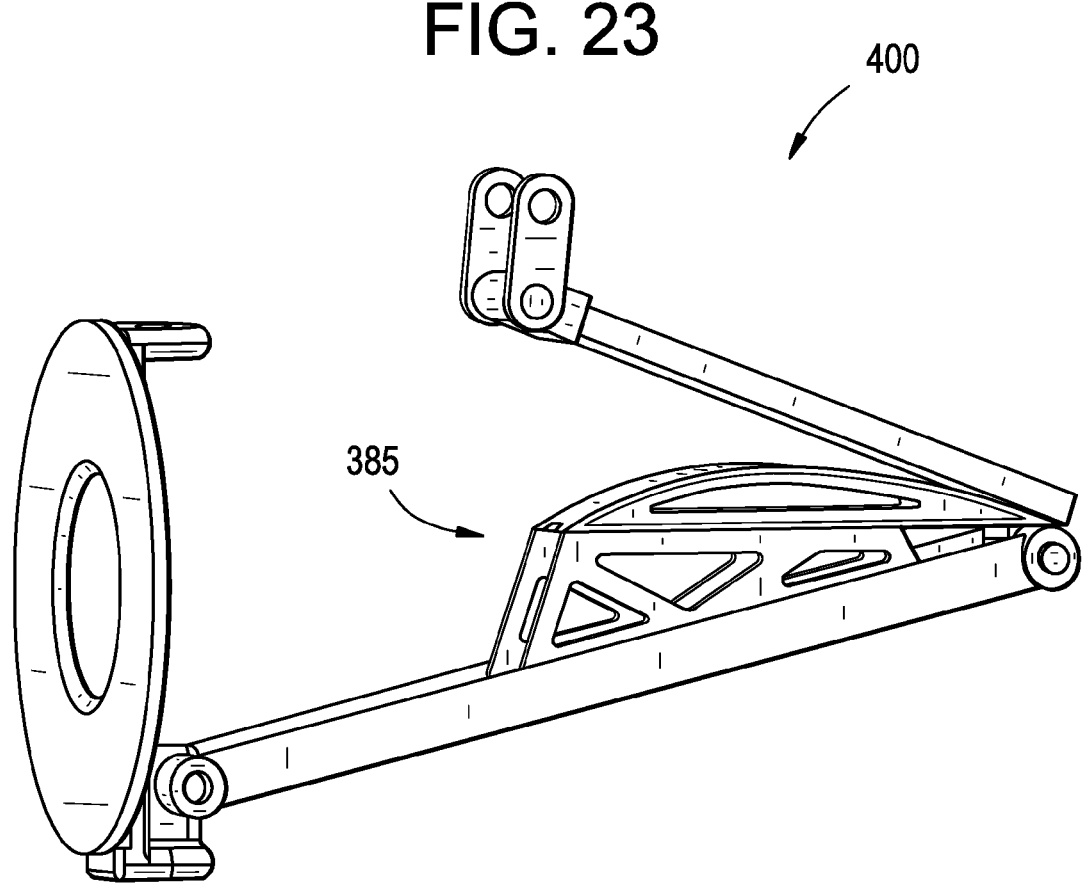
FIG. 23 is a schematic illustration of a further multi-link composite leaf assembly, according to embodiments.

FIG. 23 depicts a further multi-link composite leaf assembly 400 also employing linkage to control the geometry. In this embodiment, the cantilever spring 385 is in a stationary, curved form actuated by the linkage.

Figure 24:
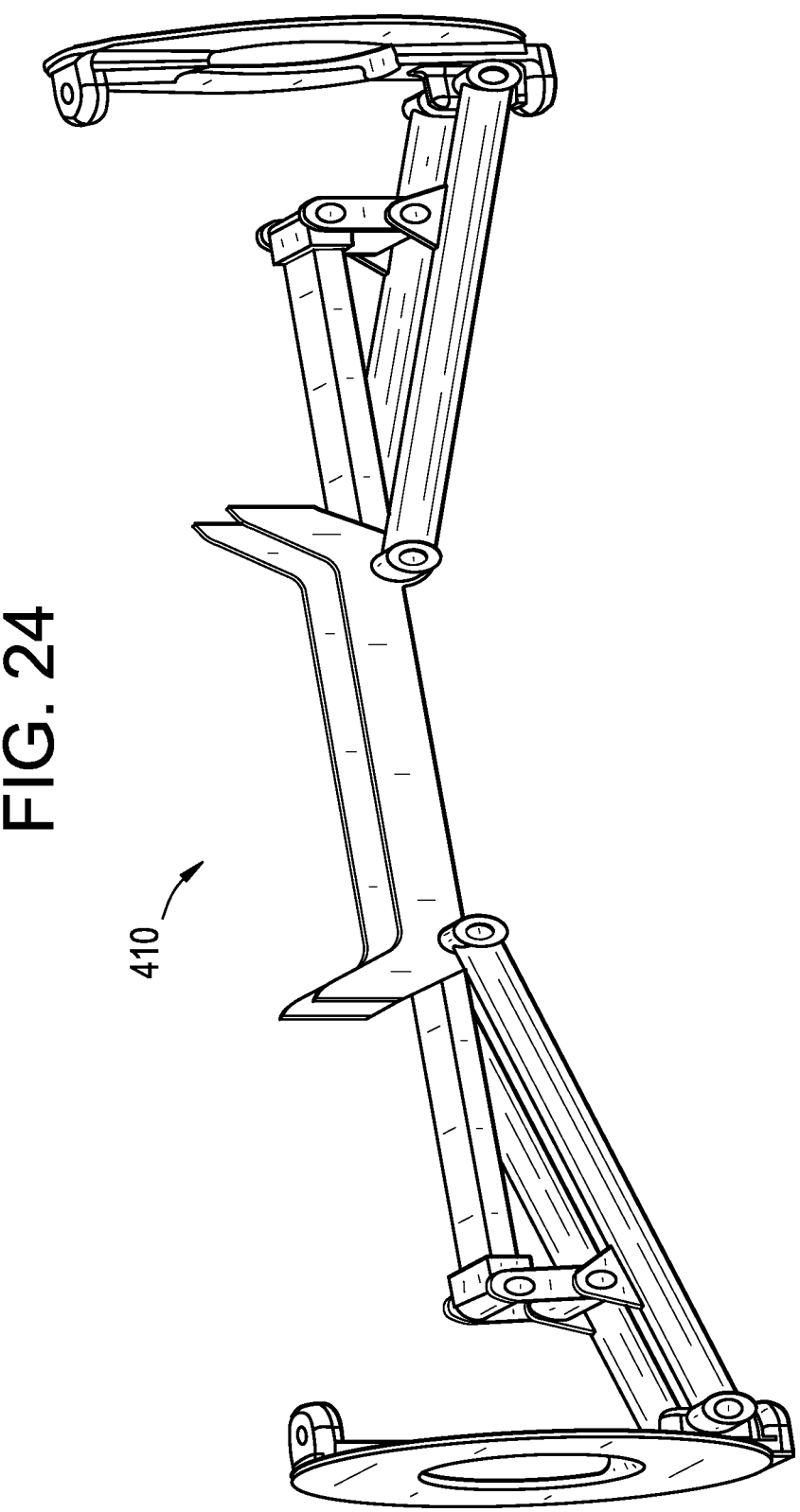
FIG. 24 is a schematic illustration of a full transverse leaf, according to embodiments.

FIG. 24 depicts a fiber reinforced polymeric (FRP) thermoplastic composite leaf 410, according to embodiments, in a full transverse leaf and shackled configuration.

Figure 25A:
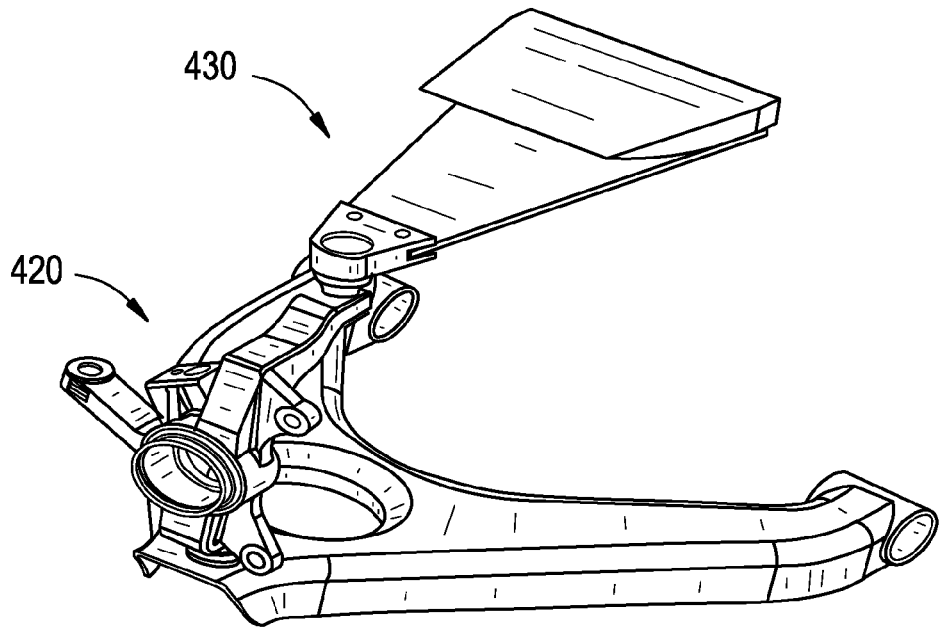
FIG. 25 depicts schematically at FIGS. 25A and 25B, a composite leaf assembly construction, according to embodiments, with an upper arm thereof functioning as a cantilever spring.
Figure 25B:
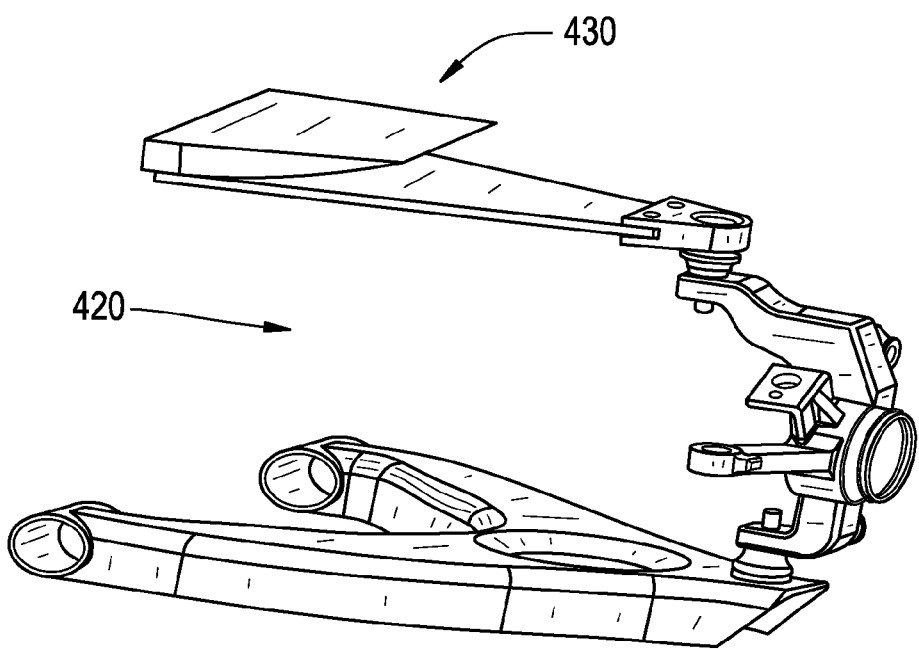

FIG. 25 depicts at FIGS. 25A and 25B a composite leaf assembly 420, according to embodiments, wherein the upper arm 430 thereof functions as a cantilever spring.

In FIG. 26, a passenger rear suspension sub-assembly construction 440 is shown comprising the fiber reinforced polymeric (FRP) thermoplastic composite leaf spring/assembly, according to embodiments, and in FIG. 27 a rear suspension sub-assembly construction 450 is shown also comprising the fiber reinforced polymeric (FRP) thermoplastic composite leaf spring/assembly, according to embodiments, and can function as a direct replacement for an existing chassis. In the depicted embodiment of FIG. 27, the left side is shown as direct acting and the right side is shown in a shackled configuration.

A further embodiment of the fiber reinforced polymeric (FRP) thermoplastic composite leaf spring 460 is shown in FIG. 28 in curved form with circular eyes 118 at each end and comprising a metal, e.g., steel main leaf 470 with a stress contoured FRP secondary leaf 480. Such a configuration can provide a reduced weight construction for, e.g., light truck chassis and can be directly bolted thereto.

A further alternative to bolting for, e.g., light truck applications, can comprise welding and fabrication the composite leaf/assembly, according to embodiments, directly on the frame to accommodate suspension design.

With regard to the methods of manufacturing, it is noted that the composite leaf springs, assemblies and so forth, according to embodiments, can be manufactured by combining the afore-described fiber reinforced polymeric (FRP) thermoplastic material including the reinforcing fibers and other appropriate materials in the presence of heat and/or pressure, usually in a mold or other device that imparts a final shape to the completed assembly. The heating and consolidating can typically be performed at, e.g., between about 400° F. and about 600° F., including between about 450° F. and about 550° F., and at a pressure of, e.g., between about 25 psi and about 100 psi, including about 50 psi. It is noted that the pressures employed in manufacturing the constructions, according to embodiments, are significantly less than the pressures that would be required in the manufacture of thermoset polymeric articles. Such thermosetting materials, such as epoxy materials, could in contrast require about 300 psi for construction. Thus, as advantage of embodiments disclosed herein is that reduced pressure may be employed in construction thereby resulting in improved cost and efficiencies of the overall manufacturing process.

Moreover, a further advantage of embodiments disclosed herein is that during, e.g., the heating and consolidating process, the fibers of the fiber reinforced polymeric (FRP) thermoplastic composite leaf spring/assembly align by hydraulic action during flow of the polymeric, thermoplastic material. Such alignment provides an increased strength when, e.g., the fibers are in tension and thus also provided an increased compression strength. It is further noted that the fibers can advantageously maintain this alignment because of the thermoplastic material flow and hydraulic action thereof, which the inventors have determined does not occur with other polymeric materials, such as thermosetting materials.

The final strength and stiffness, as well as other desirable properties, depends upon the thermoplastic material(s) used, as well as the type, size, and orientation of the reinforcements and other materials used. In addition, the strength and stiffness of the final product is also dependent upon the overall dimensional shape of the composite leaf spring, including length, width, thickness, and cross-sectional areas.

In some embodiments, the shape of the composite leaf spring may be developed by buildup of layers of pre-impregnated (prepreg) reinforcing materials. This buildup of layers is usually inserted into a shaped tool or mold, where heat and/or pressure may be applied to consolidate the materials.

The shape of the leaf spring may also be developed by the wrapping of a pre-impregnated reinforcing material around a pre-shaped core or series of cores of suitable material, or around a series of removable cores or pins, in order to develop the cross-sectional profile desired in relation to the width and length of the spring. This embodiment allows for the easy inclusion of mounting eyes which are then encased in continuous wraps of reinforced material, allowing the use of conventional mounting systems in a vehicle. Such an embodiment is shown in FIG. 4 where the eyes 118 can be incorporated into a composite leaf spring. This pre-wound assembly would then be inserted into a tool or mold and subjected to heat and/or pressure, as required.

In addition, the afore-mentioned wrapping process may also be accompanied by the application of localized heat to the pre-impregnated material at or near the point of contact where each successive layer of pre-impregnated material comes in contact with the previous layer of pre-wound material in a continuous process. This embodiment would allow pre-formed "blanks" of pre-wound material to be stored for future shaping and/or further consolidation without the risk of the material becoming unwrapped.

EXAMPLES

Testing was conducted to demonstrate various mechanical properties of the fiber reinforced polymeric (FRP) thermoplastic composite leaf spring/assemblies, according to embodiments of the invention. Such testing conditions and results are set forth in detail below.

It is noted that a purpose of the testing was to determine the tensile creep properties of the specimens using a static load method. The specimens, according to embodiments, comprised 70 wt. % glass continuous fiber reinforced polypropylene matrix. The test method employed covers the determination of tensile or compressive creep and creep-rupture of plastics under specified environmental conditions. While these test methods outline the use of three-point loading for measurement of creep in flexure, four-point loading (which is used less frequently) can also be used with the equipment and principles as outlined in Test Methods D 790. For measurements of creep-rupture, tension is the preferred stress mode because for some ductile plastics rupture does not occur in flexure or compression. The creep test performed here was in a laboratory air, room temperature environment, for a total of 24 hours.

FIG. 29 sets for a graph of test data summary (creep strain) versus time, according to embodiments, and Table 1A below sets forth a table summary of creep results. Further details of these fatigue testing results are also described below.

TABLE 1A

| ASTM D 2990 Creep | |
|---|---|
| Stress (psi) | 61097 |
| Load (lbs) | 2751 |
| Initial Time (sec) | 88 |
| Initial Strain | 0.013034 |
| 24 Hour Strain | 0.020454 |
| 24 Creep ($\epsilon$) | 0.007420 |

Accordingly, testing was conducted to evaluate the mechanical properties of fiber reinforced thermoplastic composite material. Specimens, according to embodiments, comprised 70 wt. % glass continuous fiber reinforced polypropylene matrix. It is noted that FIGS. 30-34 referenced below include data for 60 wt. % glass reinforced polypropylene.

The testing procedures were performed in accordance with the American Society for Testing and Materials (ASTM) Standard Test Methods. In particular, the ASTM Test Methods included ASTM D 3039 Tensile Properties of Fiber Resin Composites, ASTM D 695 Standard Test Method for Compressive Properties of Rigid Plastics, ASTM D 5739 Standard Test Method for Shear Properties of Composite Materials by the V-Notched Beam Method, ASTM D 2344 Standard Test Method for Short-Beam Strength of Polymer Matrix Composite Materials and Their Laminates, ASTM E 228 Aerospace series—Metallic materials—Test methods; Linear Thermal Expansion of Solid Materials with a Vitreous Silica Dilatometer, ASTM D 2990 Standard Test Methods for Tensile, Compressive, and Flexural Creep and Creep Rupture of Plastics, and ASTM D 3479 Standard Test Method for Tension-Tension Fatigue of Polymer Matric Composite Materials. In general, testing was conducted to determine, e.g., strength, modulus, Poisson's ratio, coefficient of thermal expansion, creep and fatigue life of the specimens in the fiber direction, transverse direction, or shear using a testing machine incorporating one fixed and one movable member.

The test apparatus used to conduct these ASTM Standard Test Methods is described in the ASTM Standard E 4, Practices for Lad Verification of Testing Machines. All tests were performed in laboratory air. The specimens used to conduct these tests were machined to the nominal dimensions described in each specification. Tabs made from the same material as the specimens were bonded to the specimens using FM-73 adhesive. Load was applied to the specimens by the MTS 100 kN servohydraulic test frame with digital controller and data acquisition. Hydraulic grips incorporating wedges with non-aggressive surfaces (at a grip pressure of up to 2000 Psi) were used. Strain indicators (gages), along with extensometers were used to determine the strain, and the MTS load frame was used to determine the corresponding loads. The extensometer may be provide strain information up to specimen failure.

These standards could be used to measure and describe the response of materials, products, or assemblies to mechanical and thermal loads under controlled laboratory conditions. Results of the testing may be used as elements of a load-capability assessment or a load-survivability assessment which takes into account all of the factors which are pertinent to an assessment of the load capability or load survivability of a particular end use.

The test matrix for all specimens is shown in Table 1.

TABLE 1

Test Matrix

| Qty | Test | ASTM Designation |
|---|---|---|
| 5 | Fiber Direction Tensile Strength & Modulus | D-3039 |
| 5 | Transverse Direction Tensile Strength & Modulus | D-3039 |
| 5 | Fiber Direction Compression Strength & Modulus | D-695 |
| 5 | Transverse Direction Compression Strength & Modulus | D-695 |
| 5 | In-Plane Shear Strength & Modulus (IOSEPESCU) | D-5379 |
| 3 | Fiber & Transverse Coefficient of Thermal Expansion | E-228 |
| 3 | Transverse Direction Coefficient of Thermal Expansion | E-228 |
| 2 | Room Temperature Ambient Creep (24 Hr) | D-2990 |
| 1 | Tension-Tension Fatigue | D-3479 |

Table 2 sets forth a summary of the average property results for the testing, and the ASTM Standard Method for each test.

TABLE 2

| Test Performed | ASTM | Average Property |
|---|---|---|
| Fiber Direction Tensile Strength | D-3039 | 40,572 Psi |
| Fiber Direction Tensile Modulus | D-3039 | 3,637,626 Psi |
| Transverse Direction Tensile Strength | D-3039 | 551 Psi |
| Transverse Direction Tensile Modulus | D-3039 | 508,371 Psi |
| Poisson's Ratio | D-3039 | 0.14 |
| Fiber Direction Compression Strength | D-695 | 32,409 Psi |
| Fiber Direction Compression Modulus | D-695 | 3,685,869 Psi |
| Transverse Direction Compression Strength | D-695 | 6156 Psi |
| Transverse Direction Compression Modulus | D-695 | 135,638 Psi |
| In-Plane Shear Strength (IOSEPESCU) | D-5379 | 3580 Psi |
| In-Plane Shear Modulus (IOSEPESCU) | D-5379 | 147,463 Psi |
| Interlaminar Shear Strength (short beam shear) | D-2344 | 3743 Psi |
| Fiber Direction Coefficient of Thermal Expan. | E-228 Ref. | 5.4 µε/F. |
| Transverse Direction Coefficient of Thermal. Expan. | E-228 Ref. | 35.9 µε/F. |
| Room Temperature Ambient Creep | D-2990 | 24.3 µε |
| Tension-Tension Fatigue | D-3479 | 11750 cycles |

Example 1

ASTM D3039 Tensile Properties of Fiber-Resin Composites

The results of a test for determination of the tensile properties of resin-matrix composites reinforced by oriented continuous or discontinuous high-modulus >20 Gpa (>3× $10^6$ Psi) fibers. The test was conducted in accordance with the ASTM Standard Test Method D 3039. The tensile strength and elastic modulus of the specimens were determined using a testing machine incorporating one fixed and one movable member. This can provide a means of determining the tensile strength using the following equation: $S=P/bd$ where: S=ultimate tensile strength, MPa or psi, P=maximum load, N or lbf, b=width, mm or in., and d=thickness, mm or in. To calculate the modulus of elasticity, the following equation is used: $E=(\Delta P/\Delta l)(l/bd)$ where: E=modulus of elasticity, MPa or psi, $\Delta P/\Delta l$=slope of the plot of load as a function of deformation within the linear portion of the curve, l=gage length of measuring instrument, mm or in., b=width, mm or in., and d=thickness, mm or in.

FIGS. 30 and 31 set forth a summary of the ASTM D 3039 test data summary results for fiber direction strength and modulus, respectively.

Table 3 below sets forth further test results of the specimens.

TABLE 3

| Specimen | Strength (psi) | Maximum Strain | Modulus (Psi) |
|---|---|---|---|
| 1 | 48708 | 0.01359 | 3634968 |
| 2 | 37053 | 0.01105 | 3471866 |
| 3 | 33756 | 0.00921 | 3790564 |
| 4 | 46405 | 0.01342 | 3818362 |
| 5 | 36938 | 0.01092 | 3472370 |
| Average | 40572 | 0.01164 | 3637626 |
| Standard Deviation | 6562 | 0.00185 | 166469 |

FIGS. 32 and 33 set forth transverse direction tensile strength and modulus results, respectively, using ASTM D 3039 testing standard. Table 4 below sets forth test results for further specimens.

TABLE 4

| Specimen | Strength (psi) | Maximum Strain | Modulus (Psi) |
|---|---|---|---|
| 6 | 596 | 0.00106 | 530723 |
| 7 | 362 | 0.00060 | 516071 |
| 8 | 963 | 0.00158 | 551641 |
| 9 | 523 | 0.00152 | 478909 |
| 10 | 313 | 0.00036 | 464512 |
| Average | 551 | 0.00103 | 508371 |
| Standard Deviation | 257 | 0.00054 | 36135 |

Per ASTM Standard Test Method D 3039, Tensile Properties of Fiber-Resin Composites, the average fiber direction tensile strength and elastic modulus of the fiber reinforced unidirectional thermoplastic composite, according to embodiments, was determined to be 40,572 Psi and 3,637,626, Psi, respectively, and the average transverse direction tensile strength and elastic modulus was determined to be 551 Psi and 508,371 Psi, respectively. The Poisson's ration for the composite was determined to be 0.14, according to embodiments.

Example 2

ASTM D 695 Standard Test Method for Compressive Properties of Rigid Plastics Set forth below are results of testing for determining the compression properties of resin matrix composites reinforced by oriented continuous or discontinuous high modulus fibers.

The compression strength and elastic modulus of the specimens were determined using a testing machine incorporating one fixed and one movable member. This test method covers the determination of the mechanical properties of unreinforced and reinforced rigid plastics, including high-modulus composites, when loaded in compression at relatively low uniform rates of straining or loading. Test specimens of stand shape were employed. For compressive properties of resin-matrix composites reinforced with oriented continuous, discontinuous, or cross-ply reinforcements, test may be made in accordance with ASTM D 3410.

FIGS. 34 and 35 set forth fiber direction compression strength and modulus results, respectively, using ASTM D 695. Table 5 below sets forth further specimen test results.

TABLE 5

| Specimen | Modulus (Psi) | Strength (Psi) |
| --- | --- | --- |
| 1 and Test | 3574469 | 395586 |
| 2 and a | 3468934 | 29288 |
| 3 and b | 3731030 | 32049 |
| 4 and c | 3787475 | 30986 |
| 5 and d | 3867438 | 30134 |
| Average | 3685869 | 32409 |
| Standard Deviation | 161865 | 4141 |

FIGS. 36 and 37 set forth transverse direction compression strength and modulus results, respectively, using ASTM D 695 testing standard. Table 6 below sets forth test results for further specimens.

TABLE 6

| Specimen | Modulus (Psi) | Strength (Psi) |
| --- | --- | --- |
| 6 and e | 110161 | 6199 |
| 7 and f | 129991 | 6181 |
| 8 and g | 113723 | 6027 |
| 9 and h | 155372 | 6322 |
| 10 and i | 168941 | 6050 |
| Average | 135638 | 6156 |
| Standard Deviation | 257786 | 120 |

Per ASTM Standard Test Method D 695, the average fiber direction compressive strength and compression modulus of the fiber reinforced unidirectional thermoplastic composites, according to embodiments, was determined to be 32,409 Psi and 3,685,869 Psi, respectively, and the average transverse direction compression strength and compression modulus was determined to be 6,156 Psi and 1356,638, respectively.

Example 3

ASTM D 5379 Test Method for Shear Properties of Composite Materials by the V-Notched Beam Method Set forth below are results of testing for determining shear properties of resin matrix composites reinforced by oriented continuous or discontinuous high modulus fibers by the V-Notched beam method.

The shear strength and modulus of the specimens were determined using a testing machine incorporating one fixed and one movable member. The test method covers the determination of the shear properties of composites materials reinforced by high modulus fibers. The composite materials were continuous fiber or discontinuous fiber reinforced composites in the following forms: 1) Laminates composed only of unidirectional fibrous laminate, with the fiber direction oriented either parallel or perpendicular to the loading axis; 2) Laminates composed only of woven fabric filamentary laminate with the warp direction oriented either parallel or perpendicular to the loading axis; 3) Laminates composed only of unidirectional fibrous laminate, containing equal numbers of plies oriented at 0 and 90 in a balanced and symmetric stacking sequence, with the 0 direction oriented either parallel or perpendicular to the loading axis; 4) Short-fiber-reinforced composites with a majority of the fibers being randomly distributed. This shear test concept was originally developed without reference to fiber direction for use on isotropic materials such as metals or ceramics.

FIGS. 38 and 39 set forth in plane shear strength and in plane shear modulus, using ASTM D 5379. Table 7 below sets forth further specimen test results.

TABLE 7

| Specimen | Strength (Psi) | Modulus (Psi) |
| --- | --- | --- |
| 1 | 3594 | 152596 |
| 2 | 3502 | 154784 |
| 3 | 3635 | 152208 |
| 4 | 3588 | 138318 |
| 5 | N/A | 139407 |
| Average | 3580 | 147463 |
| Standard Deviation | 56 | 7922 |

Per ASTM Standard Test Method D-5379, the average shear strength and modulus of the fiber reinforced unidirectional thermoplastic composite, according to embodiments, was determined to be 3580 Psi and 147,463, respectively.

Example 4

ASTM D 2344 Standard Test Method for Short-Beam Strength of Polymer Matrix Composite and their Laminates Set forth below are results of testing for determining the apparent interlaminar shear properties of resin-matrix composites reinforced by oriented continuous or discontinuous high modulus fibers by the Short Beam Shear Method.

The apparent interlaminar shear strength of the specimens was determined using a testing machine incorporating one fixed and one movable member. This test method determined the short-beam strength of high-modulus fiber-reinforced composite materials. The specimen was a short beam machined from a curved or a flat laminate up to 6.00 mm (0.25 in.) thick. The beam was loaded in three-point bending. Application of this test method was for the continuous- or discontinuous-fiber-reinforced polymer matrix composites, for which the elastic properties are balanced and symmetric with respect to the longitudinal axis of the beam. FIG. 40 sets forth these interlaminar shear strength test results, and Table 8 below sets forth further specimen test results.

TABLE 8

| Specimen | Width (in) | Thickness (in) | Pmax (lbs) | Shear Strength (psi) |
|---|---|---|---|---|
| 1 | 0.24065 | 0.11035 | 145 | 4095 |
| 2 | 0.24165 | 0.11135 | 132 | 3679 |
| 3 | 0.24145 | 0.11145 | 130 | 3623 |
| 4 | 0.24110 | 0.11075 | 140 | 3932 |
| 5 | 0.24135 | 0.11105 | 139 | 3890 |
| 6 | 0.24280 | 0.11130 | 130 | 3608 |
| 7 | 0.24220 | 0.11095 | 138 | 3852 |
| 8 | 0.24185 | 0.11160 | 126 | 3501 |
| 9 | 0.24130 | 0.11125 | 137 | 3828 |
| 10 | 0.24165 | 0.11140 | 123 | 3427 |
| Average | 0.24160 | 0.11115 | 134 | 3743 |
| Standard Deviation | 0.00060 | 0.00038 | 7 | 210 |

Per ASTM Standard Test Method D 2344, the average apparent interlaminar shear strength of the fiber reinforced unidirectional thermoplastic composite, according to embodiments, was 3743 Psi.

Example 5

ASTM E 228 Aerospace Series-Metallic Materials; Linear Thermal Expansion of Solid Materials with a Vitreous Silica Dilatometer Set forth below are the results of testing for the determination of linear thermal expansion of resin-matrix composites reinforced by oriented continuous or discontinuous high-modulus fibers. The test was conducted in accordance with the Vishay Micro-Measurements Tech Note TN-513-1 (also referenced with respect to ASTM E 228 Standard No. E 228, as noted above).

The linear thermal expansion of the specimens were determined using an oven with a digital controller and a non-expanding ceramic reference specimen. Tables 9 and 10 below sets forth resultant longitudinal coefficient of thermal expansion data and transverse coefficient of thermal expansion data, respectively.

TABLE 9

| Specimen | µε at 71.0 F. | µε at 130.0 F. | CTE (µε/F.) |
|---|---|---|---|
| Reference | 0 | −393 | 0 |
| 1 | 0 | −86 | 5.2 |
| 2 | 0 | −67 | 5.5 |
| 3 | 0 | −72 | 5.4 |
| Average | | | 5.4 |

TABLE 10

| Specimen | µε at 71.0 F. | µε at 130.0 F. | CTE (µε/F.) |
|---|---|---|---|
| Reference | 0 | −393 | 0 |
| 1 | 0 | 1677 | 35.1 |
| 2 | 0 | 1775 | 36.7 |
| 3 | 0 | 1723 | 35.9 |
| Average | | | 35.9 |

Per the forgoing testing, the average fiber direction and transverse linear coefficient of thermal expansion of the fiber reinforced unidirectional thermoplastic composite, according to embodiments, was determined to be 5.4 µε/F and 35.9 µε/F, respectively.

Example 6

ASTM D 2990 Standard Test Methods for Tensile, Compressive, and Flexural Creep and Creep-Rupture of Plastics Set forth below are the results of testing for determining the tensile creep properties pursuant to ASTM D 2990 testing.

The tensile creep properties of the specimens were determined using a static load method, which covers the determination of tensile or compressive creep and creep-rupture of materials under specified environmental conditions. While these test methods outline the use of three-point loading for measurement of creep in flexure, four-point loading could also be used with the equipment and principles as outlined in Test Methods D 790. For measurements of creep-rupture, tension is the preferred stress mode because for some ductile plastics rupture does not occur in flexure or compression. The creep test performed here was in a laboratory air, room temperature environment, for a total of 24 hours.

FIGS. 41 and 42 set forth creep strain versus time for specimens 1 and 2, respectively. Table 11 below sets forth further test data results for these specimens.

TABLE 11

| | ASTM D 2990 Creep | | | | | |
|---|---|---|---|---|---|---|
| Specimen No. | Stress (Psi) | Load (lbs) | Initial Time (sec) | Initial Strain | 24 Hour Strain | 24 Hour Creep (µε) |
| 1 | 32000 | 1732.613 | 78 | 0.008524 | 0.008791 | 0.000267 |
| 2 | 32000 | 1689.254 | 77 | 0.008038 | 0.008256 | 0.000218 |

Per ASTM Standard Test Method D 2990, the average room temperature tensile creep strain for 24 hours of the fiber reinforced unidirectional thermoplastic composite, according to embodiments, was determined to be 24.3µε.

Example 7

ASTM D 3479 Standard Test Method for Tension-Tension Fatigue of Polymer Matrix Composite Materials Set forth below are the results of testing for determining the tension-tension fatigue of polymer matrix composite materials. The test was conducted in accordance with ASTM D 3479, wherein a testing machine incorporating one fixed and one movable member was employed. This test method determines the fatigue behavior of polymer matrix composite materials subjected to tensile cyclic loading. The composite material tested were in the form of continuous-fiber or discontinuous-fiber reinforced composites for which the elastic properties are specially orthotropic with respect to the test direction. This test method was for unnotched test specimens subjected to constant amplitude uniaxial in-plane loading where the loading is defined in terms of a test control parameter. This test method employed two procedures where each defines a different test control parameter: Procedure 1: A system in which the test control parameter is the load (stress) and the machine is controlled so that the test specimen is subjected to repetitive constant amplitude load cycles. In this procedure, the test control parameter may be described using either engineering stress or applied load as a constant amplitude fatigue variable; Procedure 2: A system in which the test control parameter is the strain in the loading direction and the machine is controlled so that the test specimen is subjected to repetitive constant amplitude strain cycles. In this procedure, the test control parameter may be described using engineering strain in the loading direction as a constant amplitude fatigue variable.

FIG. 43 sets forth a stress strain diagram depicting the results of the afore-referenced testing. Tables 12 and 13 below set forth further testing results and parameters.

TABLE 12

| Ppeak (lbs) | 1758 |
|---|---|
| Pvalley (lbs) | 176 |
| Cycles to Failure | 11750 |

TABLE 13

| Cycles | Modulus (Psi) |
|---|---|
| 0 | 3977405 |
| 505 | 4037072 |
| 1010 | 4030765 |
| 2018 | 4024557 |
| 3036 | 4014639 |
| 4003 | 4004418 |
| 5010 | 3968809 |
| 6019 | 3908714 |
| 7027 | 3776901 |
| 8004 | N/A |
| 9012 | N/A |
| 10019 | N/A |

In view of the afore-referenced described testing, the fiber reinforced thermoplastic composite material transfers the load to the strong fibers very well, according to embodiments, and there was virtually no creep in the longitudinal direction (less than 30 microstrain) due to a loading equal to 80% of the failure stress. Also, the strain toward the end of the 24 hours was almost constant, so no further creep is expected beyond 24 hours of loading. The results show a very repeatable CTE over the 3 specimens tested in both the longitudinal and transverse directions. In fatigue, again this materials shows great load transfer to the fibers. There was only a minimal loss of modulus over the entire fatigue cycles to failure. Failure occurred at almost 12000 cycles. For this fiber reinforced thermoplastic composite material, according to embodiments, the longitudinal and transverse strength and modulus tests performed, along with the creep and fatigue, showed consistently that much of the load transfer to the strong continuous fibers was achieved. Thus, the results from these tests may be able to predict, using simple models (Tsai-Hill, Tsai-Wu, rule of mixtures, etc.) the strength and modulus of this material as a function of fiber volume fraction, assuming that the quality of the laminates are consistent with the tested specimens.

Further Testing/Example

It is further noted that additional successful testing of embodiments of the invention have also been conducted. For example, fiber reinforced nylon blanks, according to embodiments, were tested (3 samples thereof) with completion of over 1.5 million cycles at 85% flex strength. The average load loss was 3%, no failures.

Although this invention has been shown and described with respect to the detailed embodiments thereof, it will be understood by those skilled in the art that various changes may be made and equivalents may be substituted for elements thereof without departing from the scope of the invention, and the embodiments can be employed in any combination with each other. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A composite leaf spring comprising a thermoplastic matrix material reinforced with fibers embedded and aligned in the matrix of the composite leaf spring strengthened by heat and consolidation, wherein the thermoplastic matrix comprises a fiber reinforced polymeric matrix, and the composite leaf spring has a resultant fiber direction compressive strength of at least 32,000 psi as measured by ASTM Standard Test Method D 695, with the fibers in tension, and the composite leaf spring comprises a curved portion.

2. The composite leaf spring of claim 1, wherein the composite leaf spring comprises: an elongated primary leaf element having a compression surface, an opposing tension surface, and at least one attachment section configured to attach the primary leaf to a vehicle frame, wherein the elongated primary leaf element comprises the thermoplastic matrix material reinforced with the fibers embedded and aligned in the matrix.

3. An assembly comprising the composite leaf spring of claim 2, wherein the vehicle frame is an automotive vehicle frame.

4. The composite leaf spring of claim 2, wherein the elongated primary leaf element is curved.

5. The composite leaf spring of claim 4, further comprising an insert.

6. The composite leaf spring of claim 2, wherein the elongated primary leaf element comprises stacked, successive layers forming a tapered profile.

7. The composite leaf spring of claim 2, wherein the elongated primary leaf element comprises wrapped, successive layers.

8. The composite leaf spring of claim 7, further comprising a curved insert.

9. The composite leaf spring of claim 1, comprising a curved, elongated primary leaf element comprising a metal and cladding over the primary leaf element comprising the thermoplastic matrix material reinforced with fibers embedded and aligned in the matrix.

10. The composite leaf spring of claim 1, wherein the spring is a cantilever spring.

11. The composite leaf spring of claim 1, wherein the composite leaf spring has a creep testing load of at least 2,750 pounds and at least a stress of 61,000 psi as measured by ASTM D 2990.

12. The composite leaf spring of claim 1, wherein the composite leaf spring has a shear strength of at least 3500 psi as measured by ASTM Standard Test Method D 5379.

13. The composite leaf spring of claim 1, wherein the composite leaf spring has an interlaminar shear strength of at least 3700 psi as measured by ASTM Standard Test Method D 2344.

14. The composite leaf spring of claim 1, wherein the matrix material comprises a material selected from the group consisting of polyvinylidene fluoride, polyamide (nylon), polyethylene, polypropylene, polyethylene terephthalate, polyphenylene sulfide, polyetheretherketone, and combinations thereof.

15. The composite leaf spring of claim 14, wherein the fibers comprise a material selected from the group consisting of glass, aramid, carbon, quartz, magnesia alumuninosilicate, non-alkaline aluminoborosilicate, soda borosilicate, soda silicate, soda lime-aluminosilicate, lead silicate, non-alkaline lead boroalumina, non-alkaline barium boroalumina, non-alkaline zinc boroalumina, non-alkaline iron aluminosilicate, cadmium borate, alumina, boron, silicone carbide, graphite, ceramic, metal and combinations thereof.

16. The composite leaf spring of claim 15 wherein the matrix material comprises at least one of polyethylene terephthalate and nylon.

17. The composite leaf spring of claim 16, wherein the fibers comprise glass.

18. The composite leaf spring of claim 17, comprising a nylon matrix reinforced with E-glass fibers.

19. The composite leaf spring of claim 15, wherein the heating and consolidating are performed at a temperature of at least about 400° F. and at a pressure of at least about 50 psi.

\* \* \* \* \*